United States Patent [19]
Nakajima

[11] Patent Number: 5,748,595
[45] Date of Patent: May 5, 1998

[54] CARTRIDGE LOADING MECHANISM WITH A DOOR CLOSING ASSEMBLY

[75] Inventor: Yuji Nakajima, Yokohama, Japan

[73] Assignee: Ricoh Company, Ltd., Tokyo, Japan

[21] Appl. No.: 698,437

[22] Filed: Aug. 19, 1996

Related U.S. Application Data

[63] Continuation-in-part of Ser. No. 575,721, Dec. 18, 1995, abandoned.

[30] Foreign Application Priority Data

| Mar. 30, 1995 | [JP] | Japan | 7-97808 |
| Oct. 3, 1995 | [JP] | Japan | 7-256464 |

[51] Int. Cl.⁶ .................... G11B 33/02; G11B 17/03
[52] U.S. Cl. ........................ 369/77.2; 360/99.06
[58] Field of Search ................ 369/77.2, 77.1, 369/75.1, 75.2; 360/99.06, 99.02

[56] References Cited

U.S. PATENT DOCUMENTS

| 4,509,158 | 4/1985 | Kang | 369/77.2 |
| 5,179,484 | 1/1993 | Nakajima | 360/99.06 |
| 5,610,892 | 3/1997 | Choi | 369/77.2 |

FOREIGN PATENT DOCUMENTS

| 57-203253 | 12/1982 | Japan | 369/77.1 |
| 58-45656 | 3/1983 | Japan | 369/77.1 |
| 1-13283 | 1/1989 | Japan . | |
| 3108154 | 5/1991 | Japan . | |
| 477396 | 12/1992 | Japan . | |
| 7201166 | 8/1995 | Japan . | |

*Primary Examiner*—Stuart S. Levy
*Assistant Examiner*—Kevin M. Watkins
*Attorney, Agent, or Firm*—Cooper & Dunham LLP

[57] ABSTRACT

In a cartridge loading mechanism, a carrier is arranged on the upper side of a cartridge holder for storing a cartridge having a recording medium. A loading base is arranged on an upper side of this carrier. This cartridge holder and the carrier are attached to a swinging cam. Further, this swinging cam is swingably attached to the loading base. The cartridge holder is vertically moved in association with a horizontal movement of the carrier. The cartridge holder is reciprocated between an inserting/discharging position of the cartridge and a chucking position of a spindle motor. Thus, the body of a drive unit can be made thin while dustproof performance is secured.

4 Claims, 19 Drawing Sheets

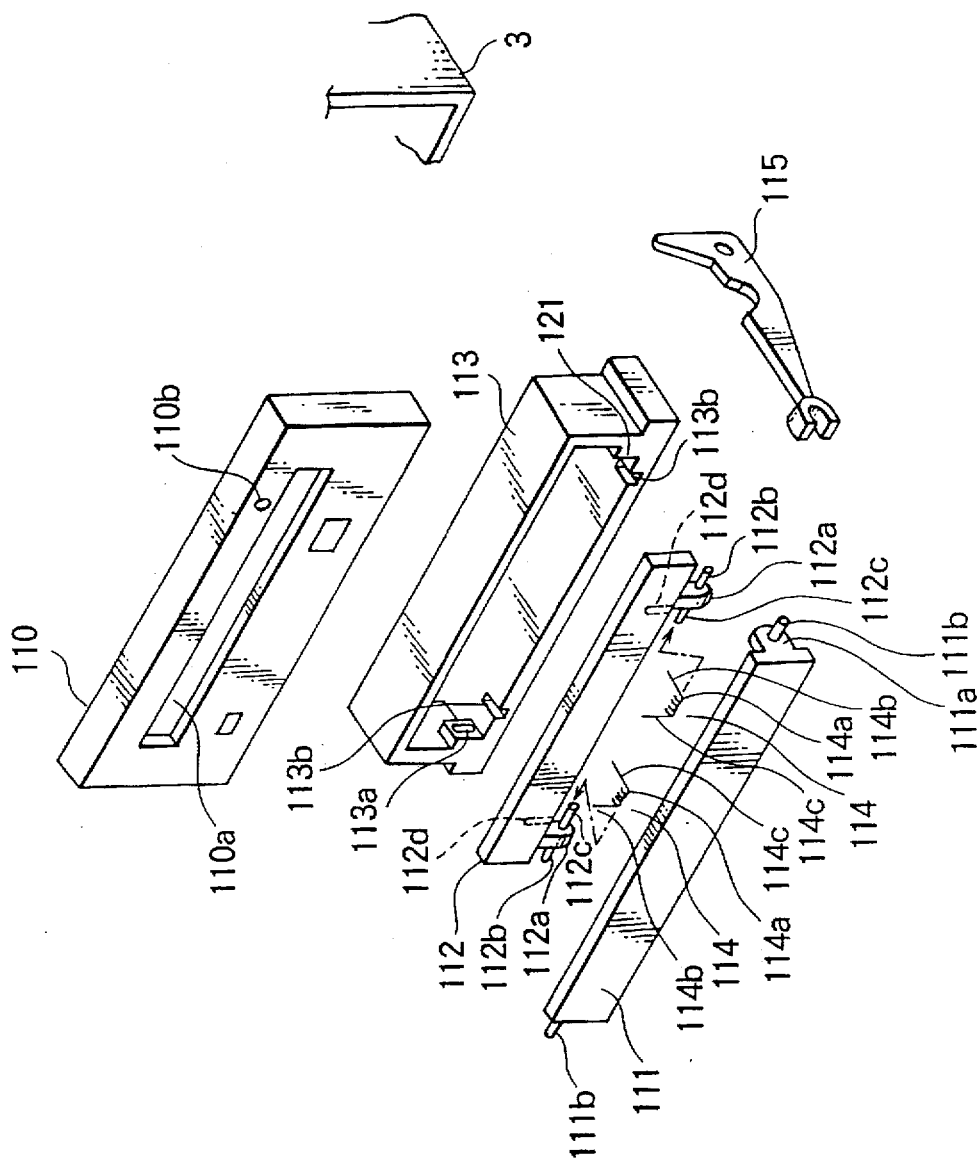

CARTRIDGE LOADING MECHANISM WITH A DOOR CLOSING ASSEMBLY

CROSS-REFERENCE TO RELATED APPLICATION

This application is a continuation-in-part of commonly owned parent application Ser. No. 08/575,721 filed Dec. 18, 1995, now abandoned, which is incorporated in its entirety herein by reference.

BACKGROUND OF THE INVENTION

1. Field of the Invention

The present invention relates to a cartridge loading mechanism applied to a disk unit of a cartridge exchanging type such as a magnetooptic disk unit, an optical disk unit, a floppy disk drive unit, a minidisk unit, etc.

2. Description of the Related Art

There is a system using a swinging cam as a general example of a typical cartridge loading mechanism of a magnetooptic disk unit. An object of this cartridge loading mechanism is to secure dustproof performance by constructing the cartridge loading mechanism as a perfect sealing structure. For example, this system using a swinging cam is used in a loading mechanism shown in Japanese Patent Application Laying Open (KOKAI) No. 3-108154.

In accordance with this system, the cartridge loading mechanism can be constructed if the swinging cam can be laid out in a clearance in width direction between a basket body or a cover constituting the sealing structure and a tray or a carrier. Therefore, the perfect sealing structure of the cartridge loading mechanism can be achieved without increasing a width of the disk unit.

In this system, the cartridge loading mechanism can be made compact in the width direction. However, since the carrier is laid out on a lower side of the tray, a space for the loading mechanism is required from the lower side of the carrier to the upper side of a magnetic head so that no drive unit can be made thin.

In a technique described in the above Japanese laid-open patent, it is possible to achieve a stable cartridge loading mechanism having high dustproof performance by a small number of constructional parts. However, after the carrier and the cam are attached to the basket body, it is necessary to fit an operating shaft of the cam into a hole of the tray while the cam is flexed outside by the tray. At this time, plastic such as polyacetal, etc. is used as a material of the cam in consideration of slidability. A thickness of this plastic is relatively thin. Therefore, the cam is deformed when flexure of the cam at this fitting time is left as it is. When a fitting amount (projecting amount) of the cam to the tray on an acting axis of the cam is reduced to easily fit the cam into the tray, an engaging amount of the cam and the tray is reduced. Therefore, the cam is disengaged from the tray during loading and unloading operations of a cartridge so that no cartridge can be accurately loaded and unloaded.

In another general technique shown in Japanese Patent Publication (KOKOKU) No. 4-77396, a dustproof door using two doors is disclosed. A second door is biased in an opening direction at any time. A lever is pushed by a cartridge lowered when the cartridge is mounted. The second door is engaged with an end tip of this lever. Accordingly, the second door is closed against biasing force in the opening direction. However, a finger is nipped by the second door when the finger is not separated fast enough from the cartridge just after the cartridge has been mounted. At this time, the driving force for pushing the cartridge down is the biasing force of a spring or power of a motor. Accordingly, this driving force is considerably strong. Therefore, when the finger is nipped, there is a danger of injury.

To solve this problem, inventors of this patent application previously proposed a dustproof door mechanism for biasing the second door in a closing direction at any time as shown in the patent specification of Japanese Patent Application Laying Open (KOKAI) No. 7-201166.

However, in the case of Japanese Patent Application Laying Open (KOKAI) No. 7-201166, the second door is reliably biased in the closing direction at any time with only the force for closing the second door itself. Accordingly, when a finger is nipped by the second door, there is no serious problem shown in the above-mentioned Japanese Patent Publication (KOKOKU) No. 4-77396 when it is sufficient to pull the finger out of the second door. However, a stroke for lowering a cartridge at a mounting time thereof corresponds proportionally to a stroke for closing the second door. Therefore, the second door begins to be closed simultaneously when the cartridge begins to be lowered. Accordingly, a finger is also nipped easily by the second door as in the technique of Japanese Patent Application Laying Open (KOKAI) No. 7-201166. Further, there is a problem of hurting operator's feelings although no operator is hurt. In contrast to this, when the cartridge is ejected from the cartridge loading mechanism, a stroke for raising the cartridge similarly corresponds proportionally to a stroke for opening the second door as the cartridge is raised. Therefore, when the cartridge begins to be discharged by scatter of discharging starting timing of the cartridge discharging mechanism before the cartridge is completely raised until the height of a discharging position, the cartridge is engaged with the second door and is not discharged from the cartridge discharging mechanism since no second door is opened completely.

SUMMARY OF THE INVENTION

It is therefore an object of the present invention to provide a safer thinner cartridge loading mechanism for solving the above problems.

In accordance with a first construction of the present invention, the above object can be achieved by a cartridge loading mechanism comprising:

a loading base;

a cartridge holder for mounting a cartridge storing a recording medium thereinto;

a carrier for guiding the cartridge holder to a predetermined position at an inserting or ejecting time of the cartridge;

a swinging cam for swingably attaching the cartridge holder and the carrier to the loading base; and a base plate for supporting the loading base;

the cartridge loading mechanism being constructed such that the carrier is arranged on an upper side of the cartridge holder, and the swinging cam is arranged such that the cartridge holder is vertically moved in association with a reciprocating movement of the carrier in a direction approximately equal to an inserting/discharging direction of the cartridge.

In accordance with a second construction of the present invention, the cartridge loading mechanism further comprises:

an ejecting button for receiving biasing force of the cartridge in its inserting direction by an operating jig from the exterior of the cartridge loading mechanism;

an ejecting lever having a hole portion in a central portion thereof and formed such that one end portion of the ejecting lever is connected to the ejecting button and another end portion of the ejecting lever is engaged with the carrier to move the carrier in the discharging direction of the cartridge;

a stepped pin attached to the loading base and rotatably supporting the ejecting lever through the hole portion; and biasing means for biasing the ejecting lever such that the another end portion of the ejecting lever is rotated in a direction approximately equal to a moving direction of the carrier at a loading time of the cartridge;

the hole portion is constructed by a first hole portion capable of passing a head portion of the stepped pin therethrough, and a second hole portion continuously connected to this first hole portion and fitted to a shaft portion of the stepped pin; and the ejecting lever is attached to the stepped pin such that a direction directed from a center of the second hole portion to a center of the first hole portion is approximately in conformity with a biasing direction of the biasing means.

In accordance with a third construction of the present invention, a lever pin is vertically attached to one end portion of the ejecting lever;

a hole for inserting the lever pin thereinto is formed in one portion of the ejecting button;

a groove portion is formed on a side face of the ejecting button;

the groove portion of the ejecting button is engaged with the loading base; and a supporting portion is formed to slidably support the ejecting button along the inserting direction of the cartridge.

In accordance with a fourth construction of the present invention, a front cover having a cartridge insertion port for inserting and taking out the cartridge is arranged in front of a cartridge receiving port of the cartridge holder;

a first door for opening and closing the cartridge insertion port by a rotating operation is arranged in the vicinity of this front cover;

the ejecting button is arranged in a position after the first door when the cartridge is inserted into the cartridge insertion port;

a small hole for inserting an operating jig thereinto is formed in the front cover;

a contact portion for receiving an end tip of the operating jig is formed in the ejecting button; and a groove portion is formed on a portion of a virtual line connecting the small hole to the contact portion on a back face of the first door coming in contact with the cartridge when the cartridge is inserted.

In accordance with a fifth construction of the present invention, a screw stopping portion for fixing the loading base is formed in each of four upper side corners of the base plate;

a first projection coming in contact with an end tip of the cartridge is formed on a cartridge inserting side face of a first door;

a position of this first projection is set to a position opposite to the screw stopping portion on a front side when the first door is completely opened at an inserting or discharging time of the cartridge; and a recessed portion is formed on a back face of the first projection.

In accordance with a sixth construction of the present invention, the above object can be also achieved by a cartridge loading mechanism comprising:

a loading base;

a cartridge holder for mounting a cartridge storing a recording medium thereinto;

a carrier for guiding the cartridge holder to a predetermined position at an inserting or ejecting time of the cartridge; and a base plate for supporting the loading base;

the cartridge loading mechanism being constructed such that a first door for closing the cartridge insertion port at a cartridge unloading time is rotatably arranged in the vicinity of a front cover;

a second door for closing the cartridge insertion port at a cartridge loading time is slidably attached in a direction perpendicular to a cartridge inserting/discharging direction;

a lever for moving the second door by rotating this lever in association with a movement of the carrier is arranged; and a flexible portion is formed in this lever.

In accordance with a seventh construction of the present invention, the flexible portion is formed in the shape of a leaf spring by forming a constriction in one portion of the lever.

In accordance with an eighth construction of the present invention, the flexible portion is formed in the shape of a leaf spring by forming a notch such that the notch surrounds a center of rotation of the lever from its outer side.

In accordance with a ninth construction of the present invention, the above object can be also achieved by a cartridge loading mechanism comprising:

a loading base;

a cartridge holder for mounting a cartridge storing a recording medium thereinto;

a carrier for guiding the cartridge holder to a predetermined position at an inserting or ejecting time of the cartridge;

a swinging cam for swingably attaching the cartridge holder and the carrier to the loading base; and a base plate for supporting the loading base;

the cartridge loading mechanism being constructed such that a first door for closing a cartridge insertion port at an unloading time of the cartridge is rotatably arranged in the vicinity of the front cover;

a second door for closing the cartridge insertion port at a loading time of the cartridge is slidably arranged in a direction perpendicular to an inserting/discharging direction of the cartridge;

a projection is formed in one portion of the swinging cam and extends in a diametrical direction in a state in which an attaching portion of the swinging cam to the loading base is set to a center;

a lever has a groove portion in an end tip portion thereof and this groove portion is engaged with a boss portion formed on at least one of right-hand and left-hand sides of the second door;

this lever also has a shaft on a side opposite to this end tip portion and this shaft extends in the same shaft direction as the attaching portion of the swinging cam;

this lever is rotatably attached to a hole formed on at least one of right-hand and left-hand side faces of the base plate such that the lever is moved in association with a vertical movement of the second door;

a first cam portion, a notch portion and a second cam portion are formed in the lever;

the end tip portion of the lever is located in a position for completely opening the second door;

the first cam portion comes in contact with the projection of the swinging cam in a position corresponding to a time when the cartridge holder is located in a position providing an unloading state of the cartridge;

the first cam portion is constructed by a recessed portion formed in the shape of an arc having a length as a radius from the attaching portion to the projection with the attaching portion as a center;

an end tip portion of the lever is located in a position for completely closing the second door;

the notch portion is fitted to the projection of the swinging cam in a position corresponding to a time when the cartridge holder is located in a position providing a loading state of the cartridge; and the second cam portion comes in contact with the projection from a complete opening state of the second door to a closing state of the cartridge insertion port when the lever is rotated.

In accordance with a tenth construction of the present invention, a constricted portion is formed in the lever such that a width of this lever is partially narrowed approximately in a central portion thereof in the same direction as a rotating direction of the lever.

In accordance with an eleventh construction of the present invention, an escaping portion for escaping one portion of a fixing member projected into the base plate is formed in the lever when a cover member for covering an outer side of the loading base is fixed to the base plate by the fixing member.

In accordance with a twelfth construction of the present invention, the above object can be also achieved by a cartridge loading mechanism comprising:

a loading base;

a cartridge holder for mounting a cartridge storing a recording medium thereinto;

a carrier for guiding the cartridge holder to a predetermined position at an inserting or ejecting time of the cartridge;

a swinging cam for swingably attaching the cartridge holder and the carrier to the loading base; and a base plate for supporting the loading base;

the cartridge loading mechanism being constructed such that a portion of the loading base for attaching the swinging cam thereto is set to a tongue portion separated from another bent portion.

In accordance with a thirteenth construction of the present invention, a pin is located in an attaching position of the loading base for attaching the swinging cam thereto; and the swinging cam is rotatably attached to the loading base by fitting this pin into a hole formed in the swinging cam.

In accordance with a fourteenth construction of the present invention, the above object can be also achieved by a cartridge loading mechanism comprising:

a loading base;

a cartridge holder for mounting a cartridge storing a recording medium thereinto;

a carrier for guiding the cartridge holder to a predetermined position at an inserting or ejecting time of the cartridge;

a base plate for supporting the loading base;

a first door freely opened and closed by rotating the cartridge insertion port and closing the cartridge insertion port at a cartridge unloading time; and a second door slidably attached to the cartridge loading mechanism in a direction perpendicular to a cartridge inserting/discharging direction such that the cartridge insertion port is closed at a cartridge loading time;

the cartridge loading mechanism being constructed such that a rotating shaft as a center of rotation is arranged on each of right-hand and left-hand lower outer sides of the first door;

a bearing portion for supporting the rotating shaft is arranged on a lower side of the cartridge insertion port;

biasing means for biasing the first door on a side of the cartridge insertion port at any time is attached to the cartridge loading mechanism; and the first door is rotated downward at the inserting time of the cartridge.

In accordance with a fifteenth construction of the present invention, the bearing portion can be detachably attached to a body of the cartridge loading mechanism and is formed by a material having a high sliding property.

Further objects and advantages of the present invention will be apparent from the following description of the preferred embodiments of the present invention as illustrated in the accompanying drawings.

Figure 5A:
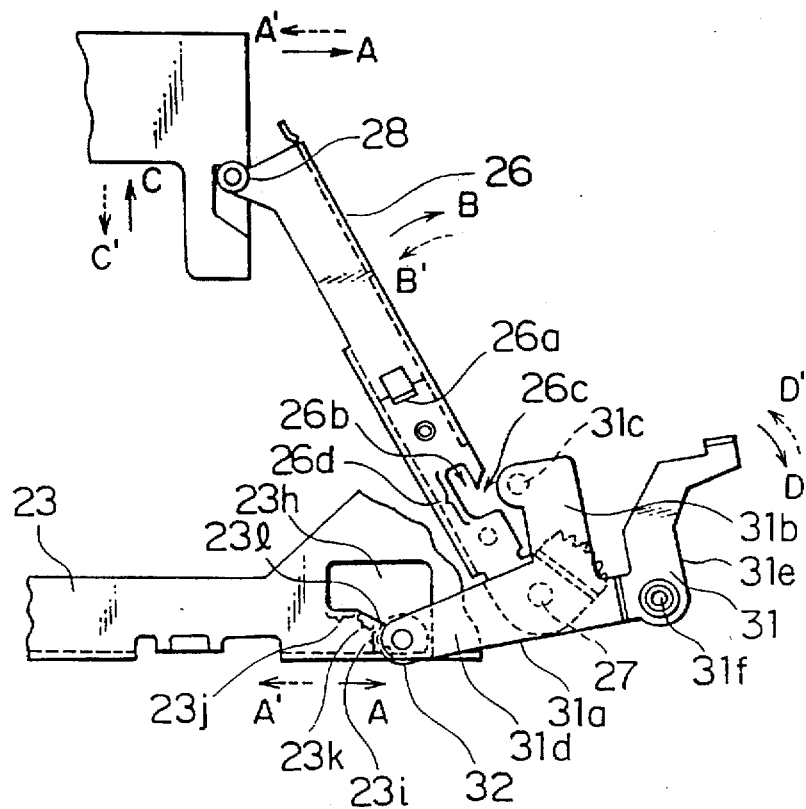
Figure 5B:
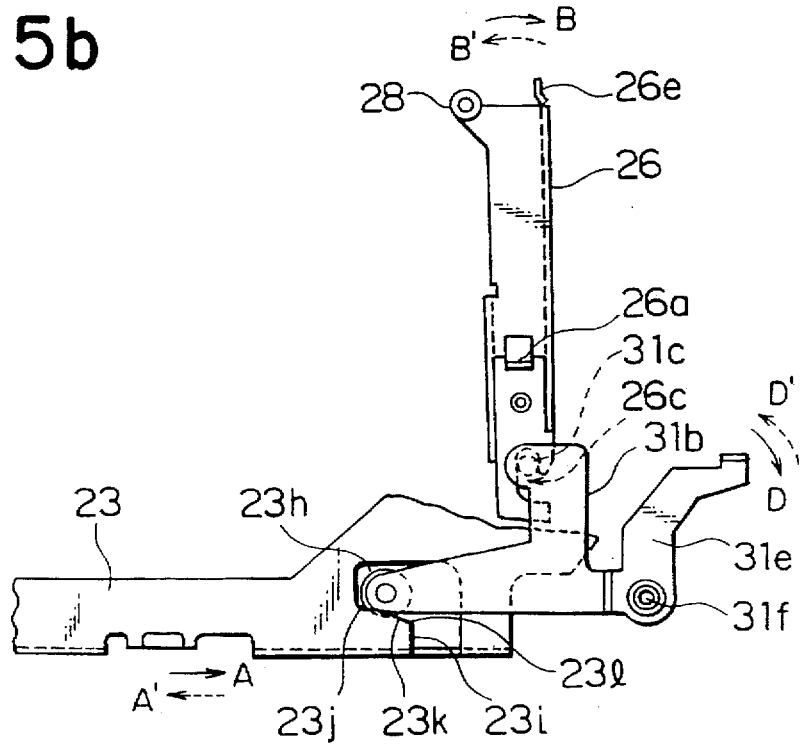
Figure 6A:
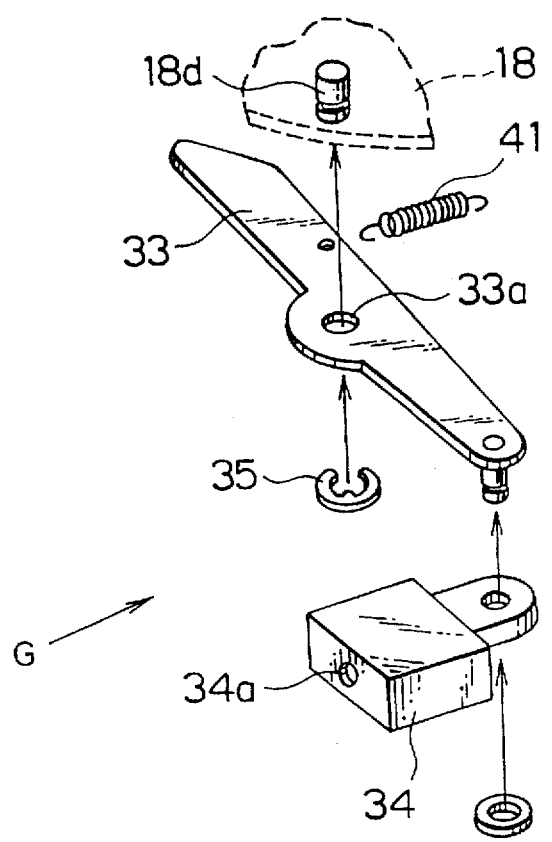
Figure 6B:
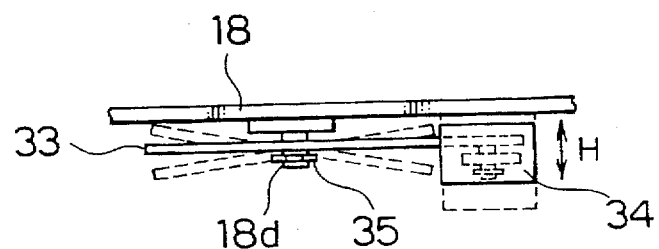
Figure 7:
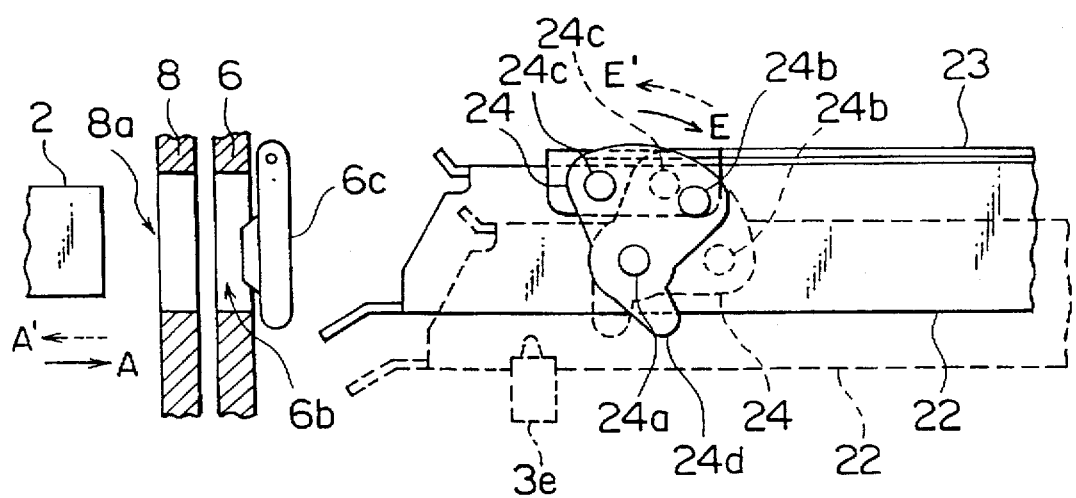
Figure 8A:
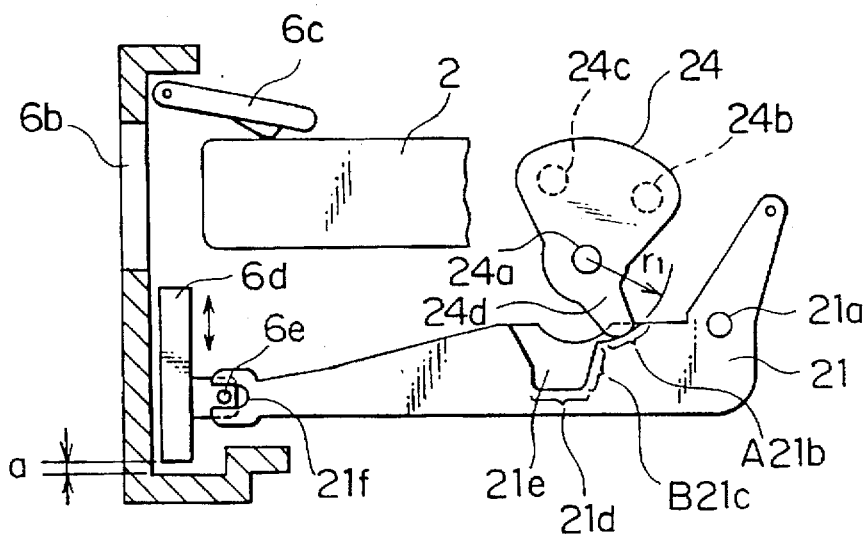
Figure 8B:
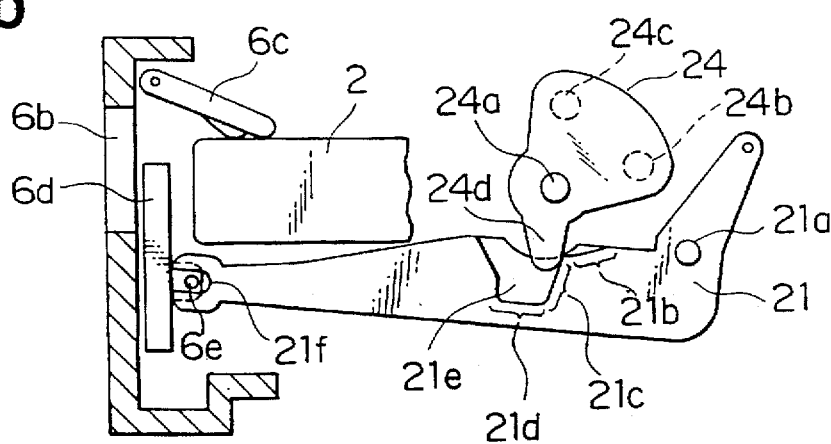
Figure 8C:
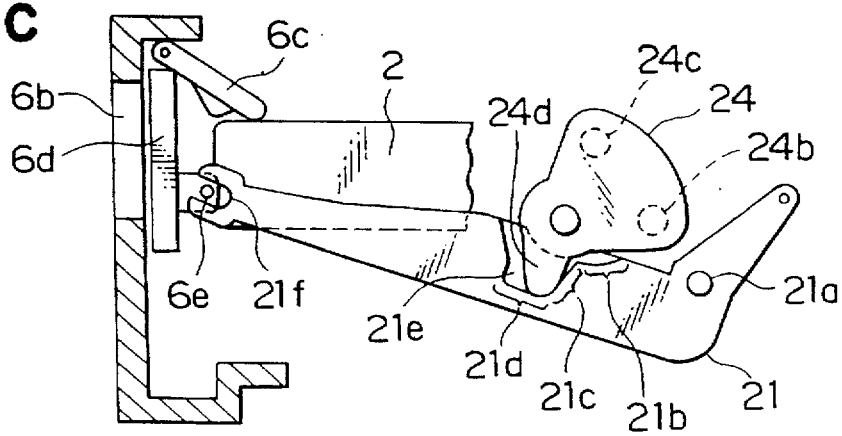
Figure 9:
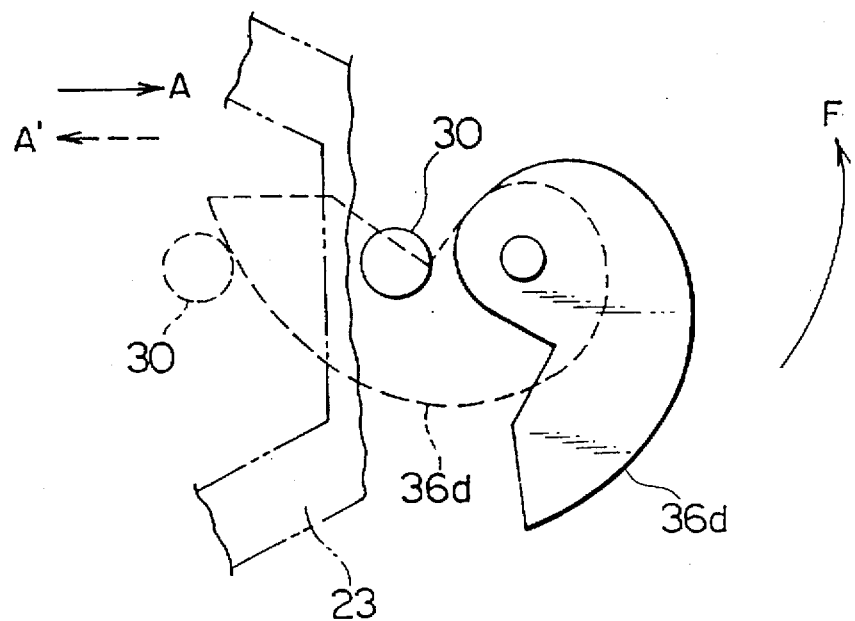
Figure 10:
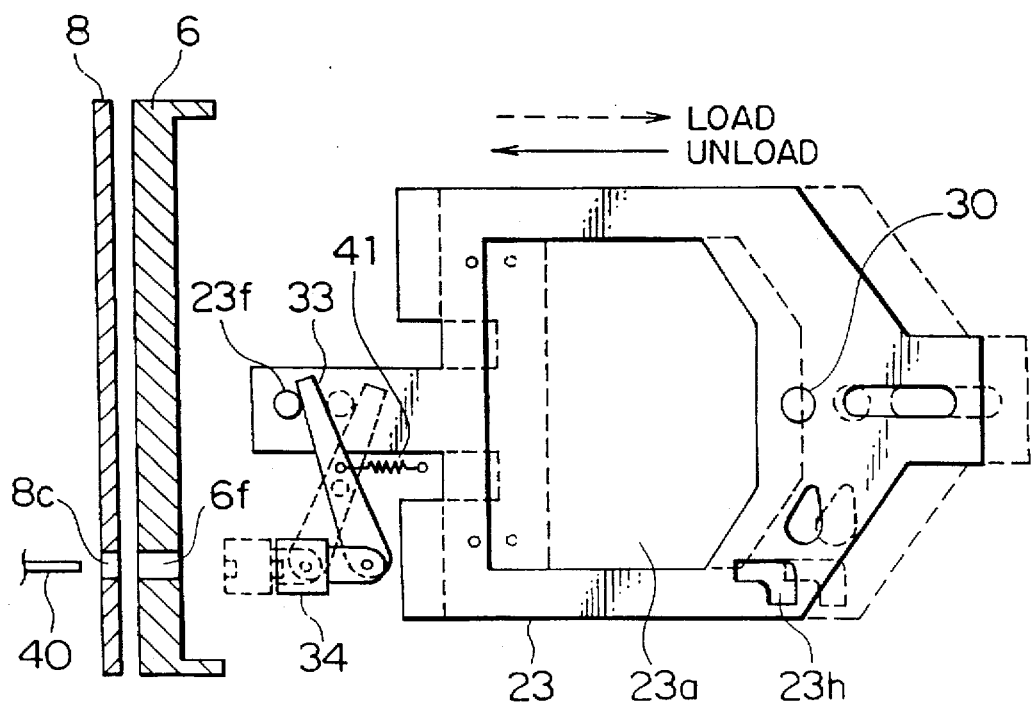
Figure 11A:
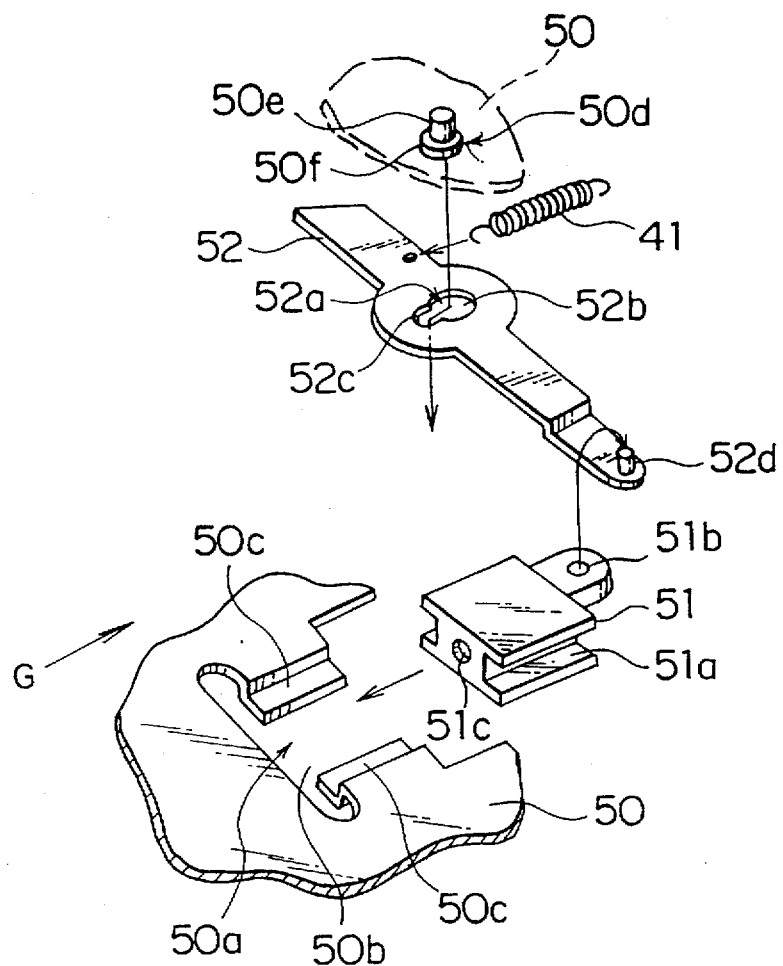
Figure 11B:
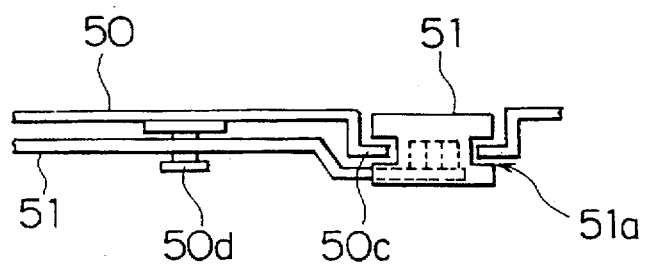
Figure 12:
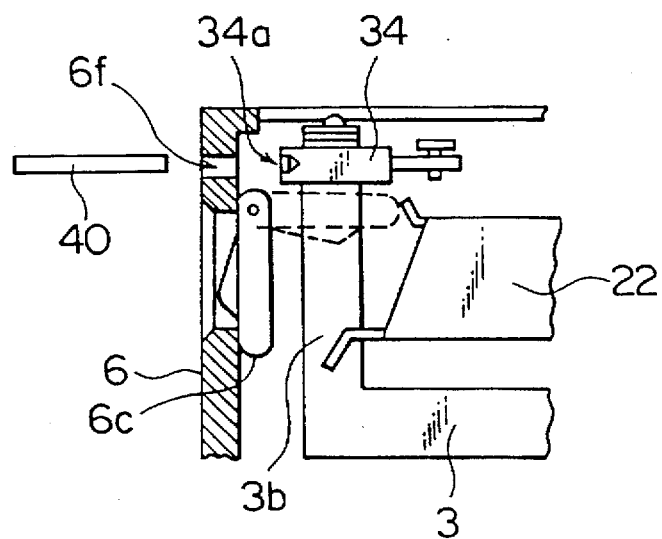
Figure 13:
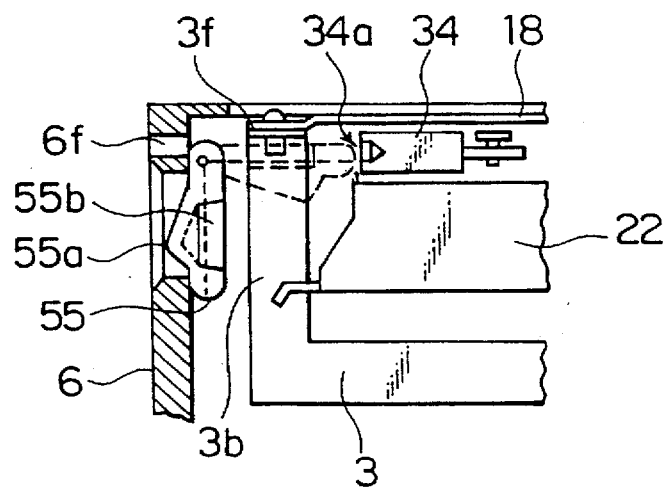

each of FIGS. 5a and 5b is a plan view showing the constructions of a right-hand lever and a latch;

each of FIGS. 6a and 6b is an explanatory view showing an emergency ejecting mechanism in accordance with the first embodiment form of the present invention;

FIG. 7 is an explanatory view showing the operations of a swinging cam and a cartridge holder;

each of FIGS. 8a, 8b and 8c is an explanatory view showing the operation of a lever and opening and closing operations of a second door caused by this lever operation;

FIG. 9 is an explanatory view showing rotation of an ejecting cam and biasing of this ejecting cam with respect to a carrier;

FIG. 10 is an explanatory view showing an operation of the emergency ejecting mechanism;

each of FIGS. 11a and 11b is a constructional view showing an emergency ejecting mechanism in accordance with a second embodiment form of the present invention;

FIG. 12 is a side view showing the construction of a mechanical portion near a first door in the first embodiment form of the present invention;

FIG. 13 is a side view showing the construction of a mechanical portion near a first door in accordance with a third embodiment form of the present invention;.

Figure 14:
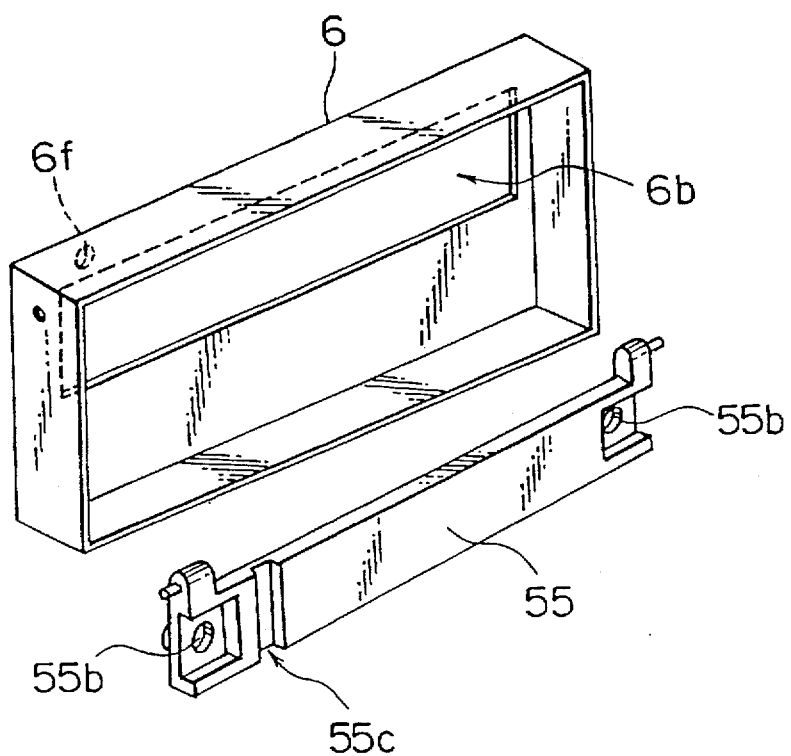
Figure 15A:
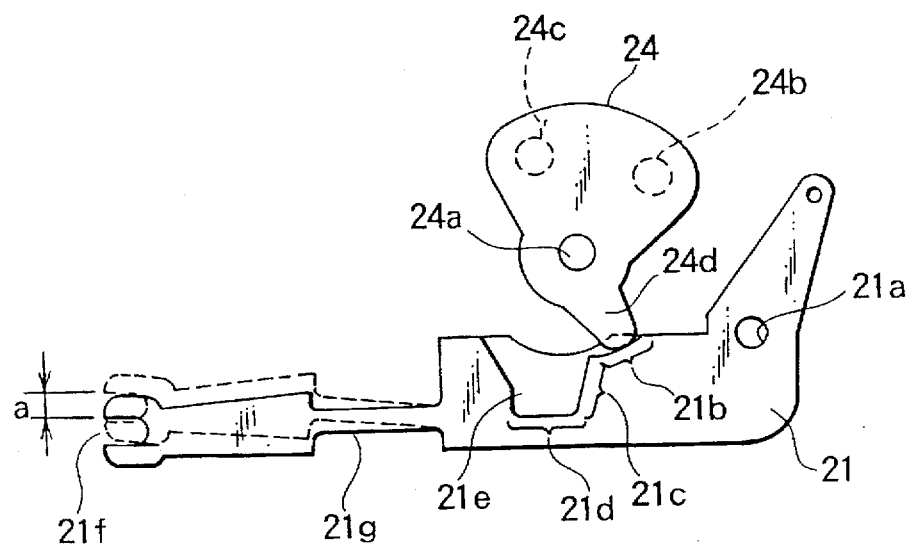
Figure 15B:
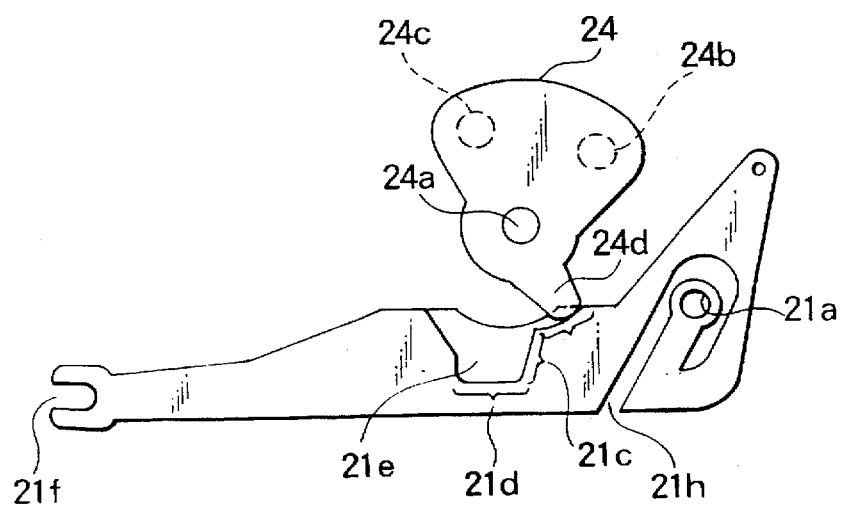
Figure 16:
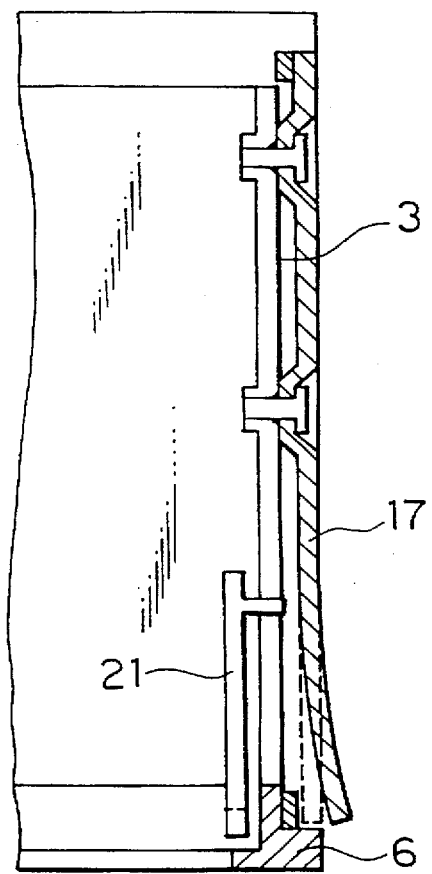
Figure 17:
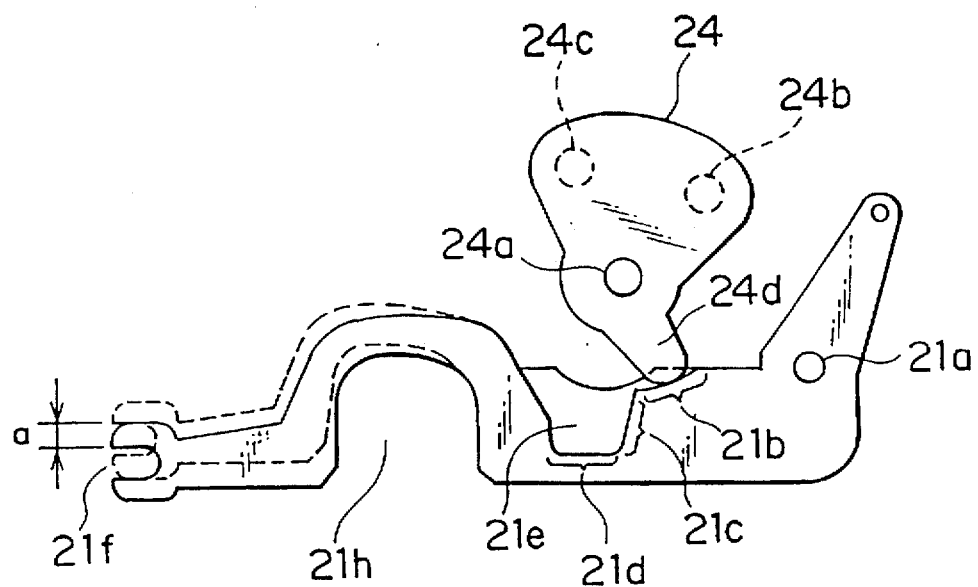
Figure 18:
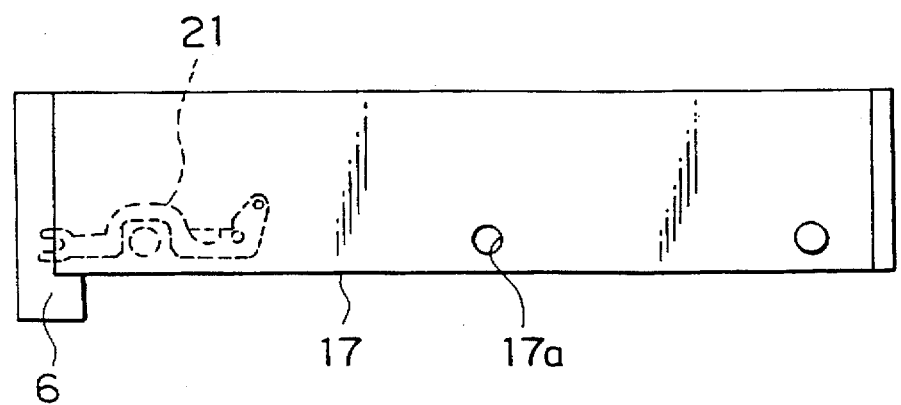
Figure 19:
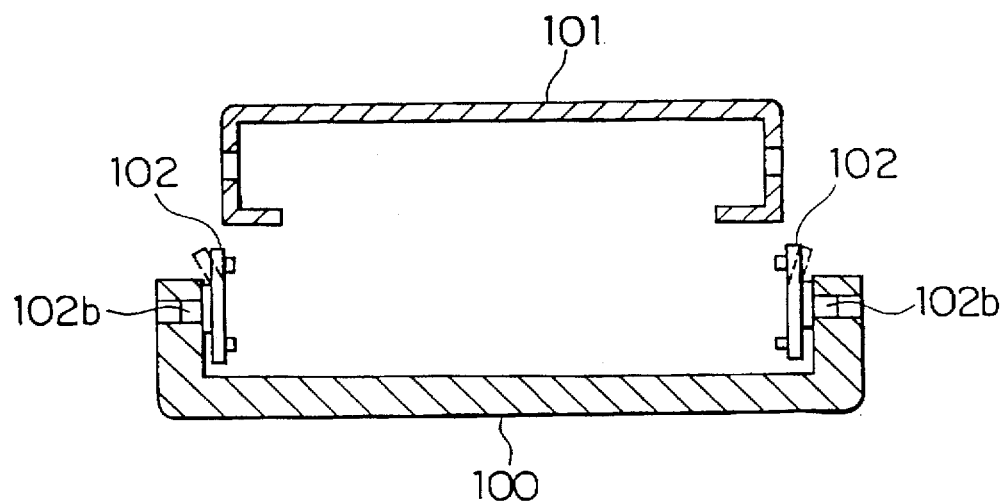
Figure 20:
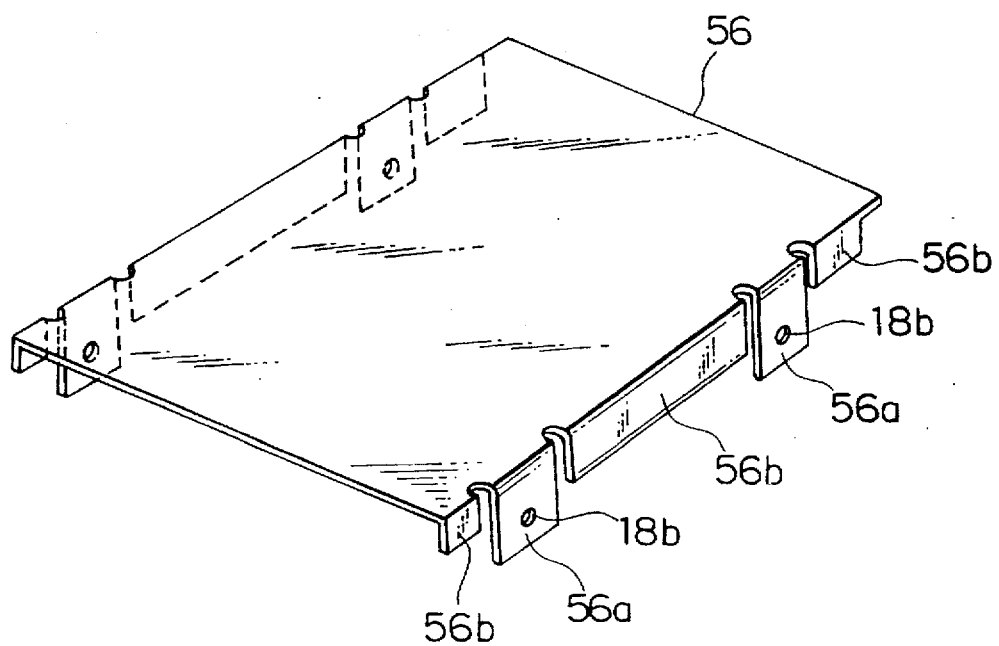
Figure 21:
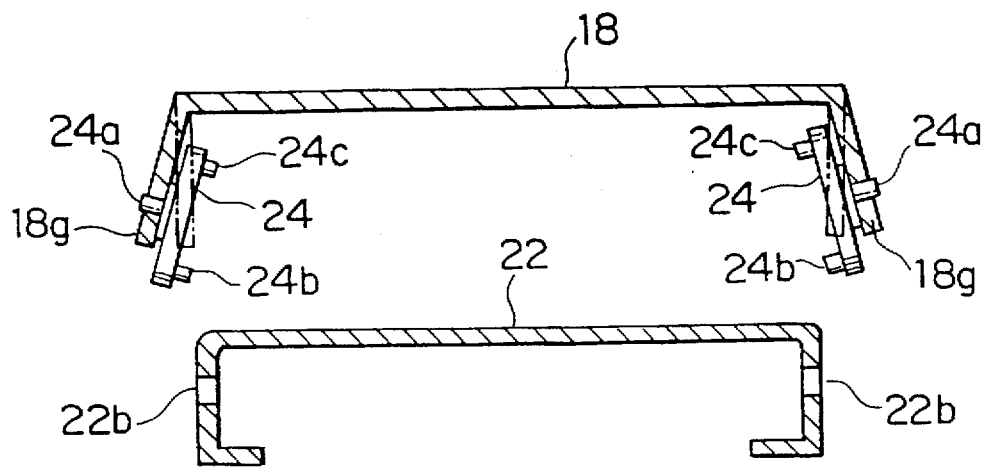
Figure 22:
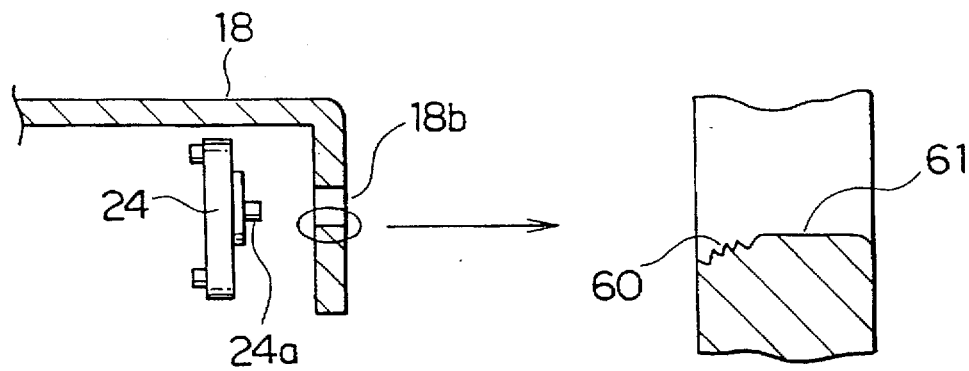
Figure 23:
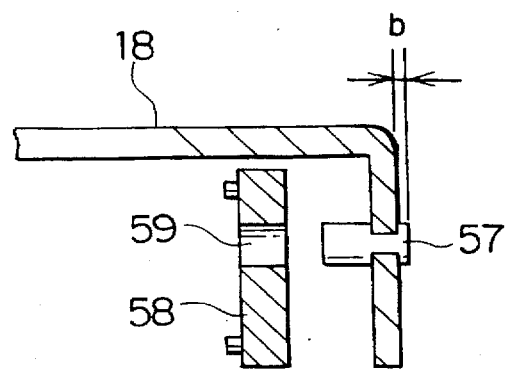
Figure 25C:
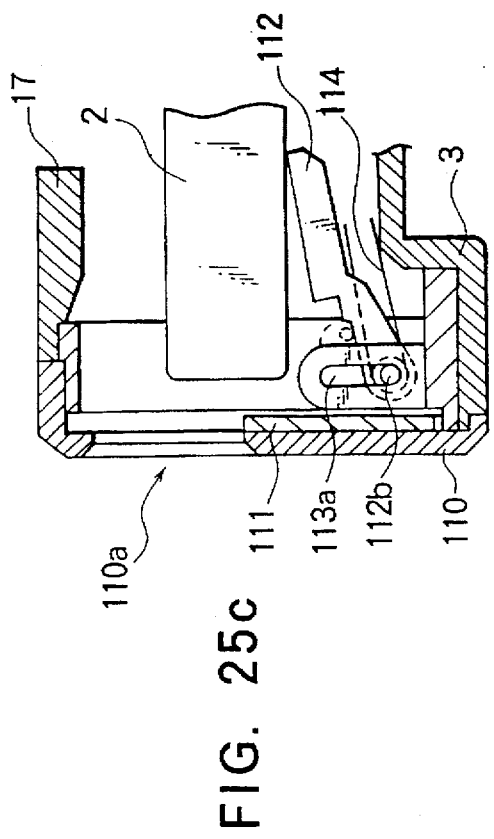
Figure 25D:
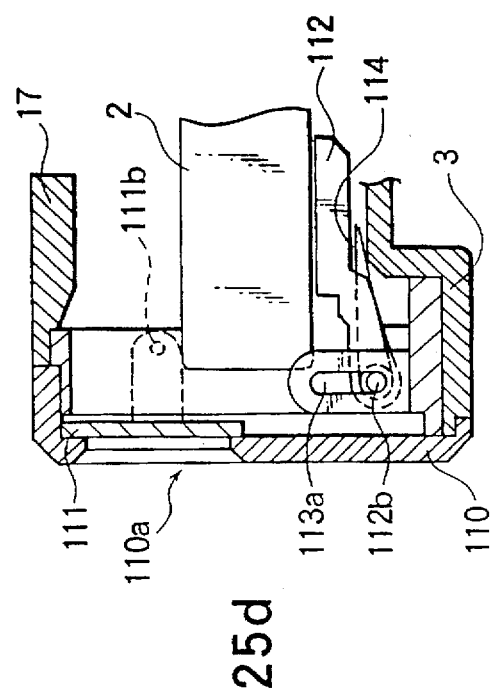
Figure 25A:
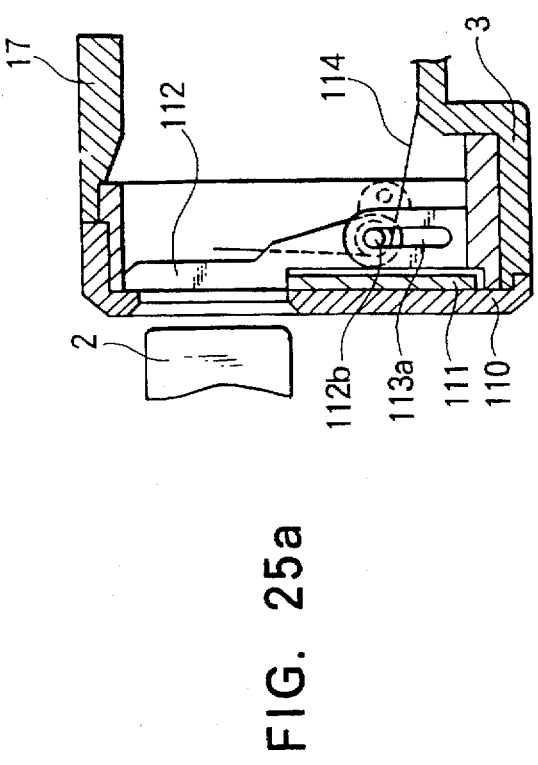
Figure 25B:
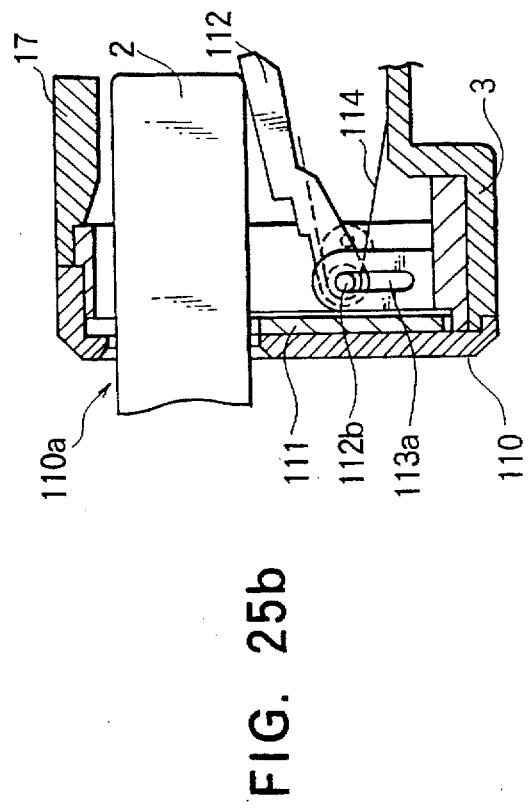
Figure 26:
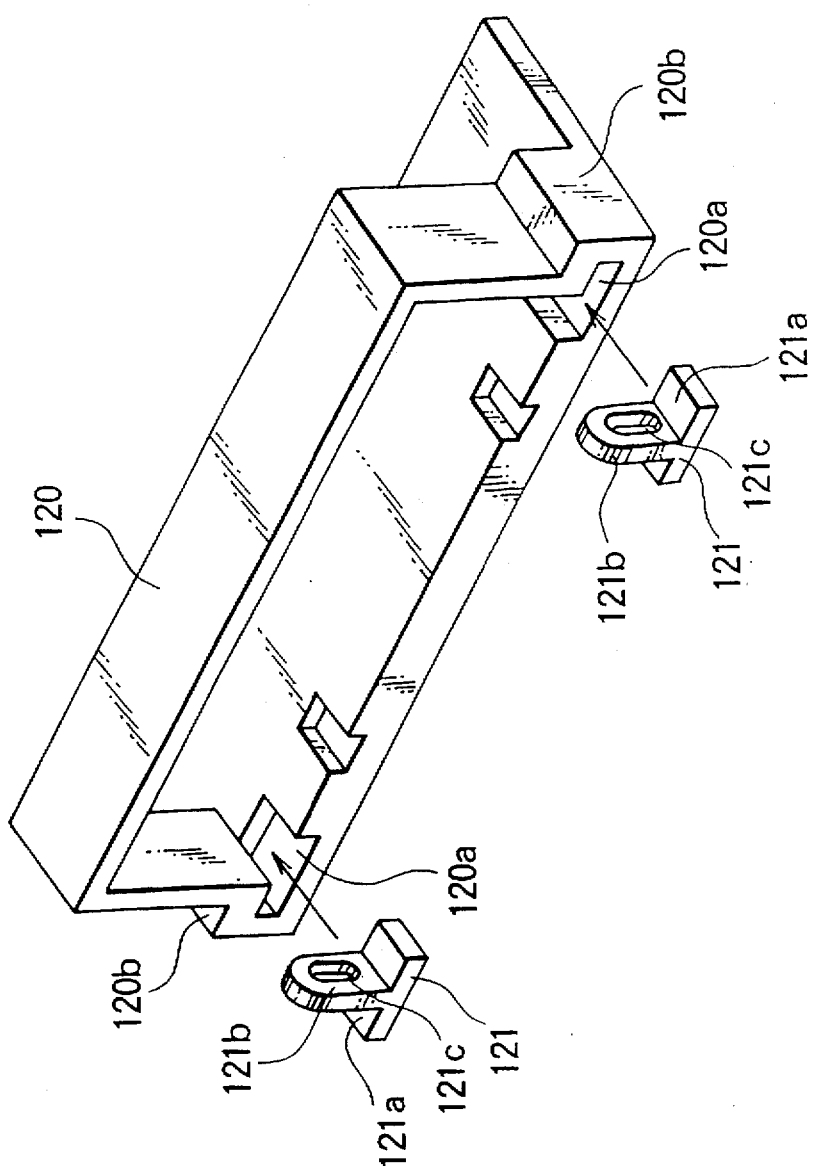

FIG. 14 is a perspective view showing the construction of the first door shown in FIG. 13;

each of FIGS. 15a and 15b is a side view showing the construction of a lever in accordance with a fourth embodiment form of the present invention;

FIG. 16 is a plan view of a main portion showing the construction of a mechanical portion near a lever in the first embodiment form of the present invention;

FIG. 17 is a side view showing the construction of a lever in accordance with a fifth embodiment form of the present invention;

FIG. 18 is a side view showing the construction of a mechanical portion near the lever in the fifth embodiment form of the present invention;

FIG. 19 is a front view showing one example of a general attachment structure for attaching a swinging cam to a cartridge holder;

FIG. 20 is a perspective view showing the construction of a loading base in accordance with a sixth embodiment form of the present invention;

FIG. 21 is a front view showing an attachment example of the loading base shown in FIG. 20;

FIG. 22 is a side view showing an attachment structure of the swinging cam to the loading base in the first embodiment form of the present invention;

FIG. 23 is a side view showing an attachment structure of the swinging cam to the loading base in accordance with a seventh embodiment form of the present invention;

FIG. 24 is an exploded perspective view showing the structure of a main portion of a cartridge loading mechanism in an eighth embodiment form of the present invention;

each of FIGS. 25a to 25d is a side view showing an operation of the cartridge loading mechanism in the eighth embodiment form; and FIG. 26 is an exploded perspective view showing the structure of a main portion of a cartridge loading mechanism in a ninth embodiment form of the present invention.

DESCRIPTION OF THE PREFERRED EMBODIMENTS

The preferred embodiments of a cartridge loading mechanism in the present invention will next be described in detail with reference to the accompanying drawings.

Figure 1:
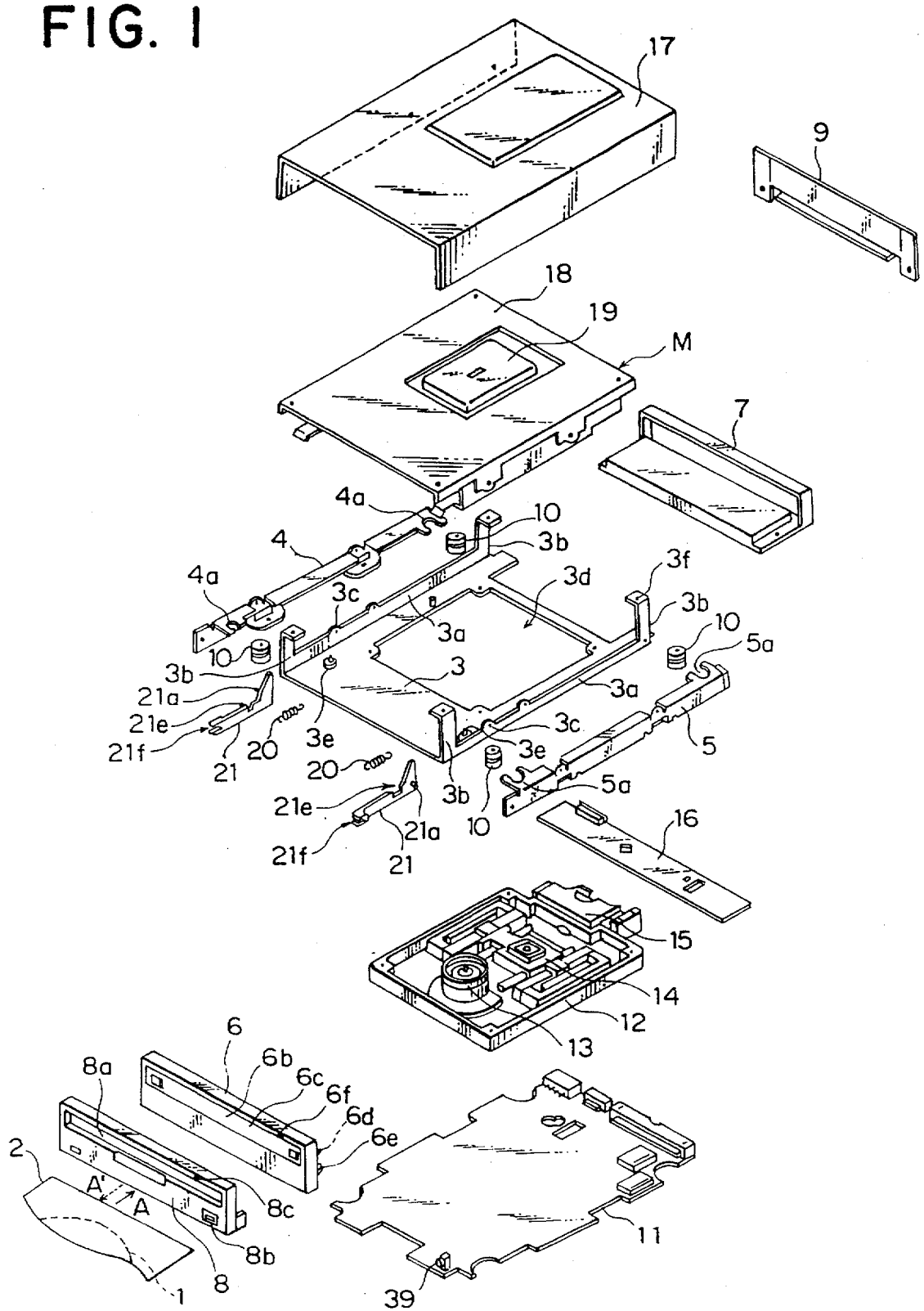
FIG. 1 is an exploded perspective view of a magnetooptic disk drive unit including a cartridge loading mechanism in accordance with a first embodiment form of the present invention.

FIG. 1 is an exploded perspective view of a disk drive unit including a cartridge loading mechanism in accordance with a first embodiment form of the present invention. Reference numerals 1, 2 and 3 respectively designate a recording medium as a magnetooptic disk, a cartridge for storing the medium 1, and a base plate. Reference numerals 4, 5 and 6 respectively designate a left-hand frame, a right-hand frame and a front cover. Reference numerals 7, 8 and 9 respectively designate a rear cover, a front face and a rear panel.

The base plate 3 approximately has a C-shape seen from a front side. Rising portions 3a, 3a bent in a vertical direction are formed in both side portions of the base plate 3. Columnar portions 3b, 3b extend from both ends of each of these rising portions 3a. A small projection is formed in one portion of each of the rising portions 3a. A hole 3c is formed on a face of this small projection. Further, an opening portion 3d is formed in a central portion of the base plate 3. Reference pins 3e for positioning the height of a cartridge 2 and front, rear, right-hand and left-hand positions of the cartridge 3 are attached to peripheral portions around this opening portion 3d.

The left-hand frame 4 and the right-hand frame 5 are respectively arranged in parallel with each other on left-hand and right-hand sides of the base plate 3 therearound. The front face 8 is attached onto a front side of the base plate 3. The rear panel 9 is attached onto a rear side of the base plate 3. Thus, a frame body of the cartridge loading mechanism is formed. Notch portions 4a and 5a are respectively formed in the left-hand frame 4 and the right-hand frame 5. Vibration proof rubber 10 is fitted into each of the notch portions 4a and 5a. The base plate 3 is attached onto this vibration proof rubber 10. The front cover 6 is attached onto the front face 8 of the base plate 3. The rear cover 7 is attached onto a rear side of the base plate 3. Thus, a vibration proof structural system with respect to the base plate 3 is formed.

A main substrate 11 holds a control unit, etc. Reference numerals 12, 13, 14 and 15 respectively designate a chassis, a spindle motor, an actuator and an optical head. The spindle motor 13 rotates a recording medium 1. The actuator 14 is used to input and output recording/regenerating signals of data of the recording medium. The spindle motor 13, the actuator 14 and the optical head 15 are attached to the chassis 12. The optical head 15 is arranged after the chassis 12. A head driving substrate 16 is attached onto an upper side of the optical head 15. The main substrate 11 is attached onto a lower face side of the chassis 12. Further, the chassis 12 is attached onto a lower side of the base plate 3. The spindle motor 13, the actuator 14, etc. are exposed from the opening portion 3d of the base plate 3.

A loading mechanism described later is arranged on an upper side of the base plate 3. A dust cover 17 is closely attached to the front cover 6, the rear cover 7 and the base plate 3 from the upper side of a loading unit M. At this time, the opening portion 3d of the base plate 3 is closed by the chassis 12 and the lower face side of the chassis 12 is closed by the main substrate 11. Therefore, an inner side of the base plate 3 forms a perfect sealing shell structure.

A cartridge insertion port 8a, an ejecting button 8b and a small hole 8c for emergency ejection are formed on the front face 8. When the ejecting button 8b is pushed, an ejecting switch 39 attached to the main substrate 11 is turned on.

Reference numeral 18 designates a loading base. Various kinds of constructional members for constituting the loading unit M are assembled into the loading base 18. In FIG. 1, reference numerals 19, 20 and 21 respectively designate a magnetic head, a torsion spring and a lever. As shown in FIGS. 8a to 8c, this lever 21 is constructed by an approximately L-shaped member having long and short extending portions. A shaft 21a of the lever 21 is vertically formed near a boundary of these long and short extending portions. A recessed portion 21e is continuously formed sequentially by a cam portion A21b, a cam portion B21c and a notch portion 21d in a central portion of the long extending portion. This cam portion A21b is formed in the shape of an arc having a radius $r_1$ from a first shaft 24a as a center in a swinging cam 24 described later to an end tip of a projection 24d. The cam portion B21c is formed such that this cam portion B21c has a steep inclination in comparison with the cam portion A21b. A bottom face of the cam portion B21c coming in contact with the end tip of the projection 24d is formed by the notch portion 21d. Further, a groove portion 21f is formed in an end tip portion of the long extending portion. Such a lever 21 is biased by the torsion spring 20 at any time in a direction in which the groove portion 21f is raised.

As shown in FIG. 1, the base plate 3 as a base is arranged as a lowermost member in the cartridge loading mechanism in the first embodiment form. The shaft 21a of the lever 21 is inserted into the hole 3c formed in each of the rising portions 3a of the base plate 3 from an inner side thereof so that the lever 21 is rotatably attached to the base plate 3.

The front cover 6 is attached onto the front side of the base plate 3. The cartridge insertion port 6b is formed in this front cover 6. A first door 6c for opening and closing the cartridge insertion port 6b is rotatably attached onto a rear side of the cartridge insertion port 6b. As shown in FIGS. 8a to 8c, a second door 6d is attached onto a back side of the front cover such that the second door 6d can be slid upward and downward. A boss portion 6e is formed on each of both left-hand and right-hand sides of the second door 6d on its rear side. This boss portion 6e is fitted into the groove portion 21f of the lever 21. A small hole 6f shown in FIG. 1 is a through hole of the front cover 6 formed in a position opposed to a small hole 8c.

As mentioned above, the columnar portion 3b is formed in each of four corners of the base plate 3. This columnar portion 3b is connected to the loading base 18 arranged on an upper side of the base plate 3. Thus, a skeleton of the cartridge loading mechanism is formed by the base plate 3 and the loading base 18. In this case, it is sufficient to form the columnar portion 3b in each of at least three positions.

Figure 3:
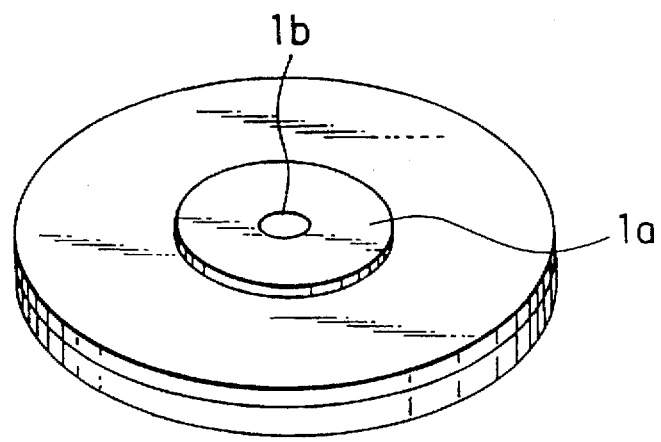
FIG. 3 is a perspective view showing the appearance of a magnetooptic disk of 130 mm type (5.25 inch type)
Figure 4:
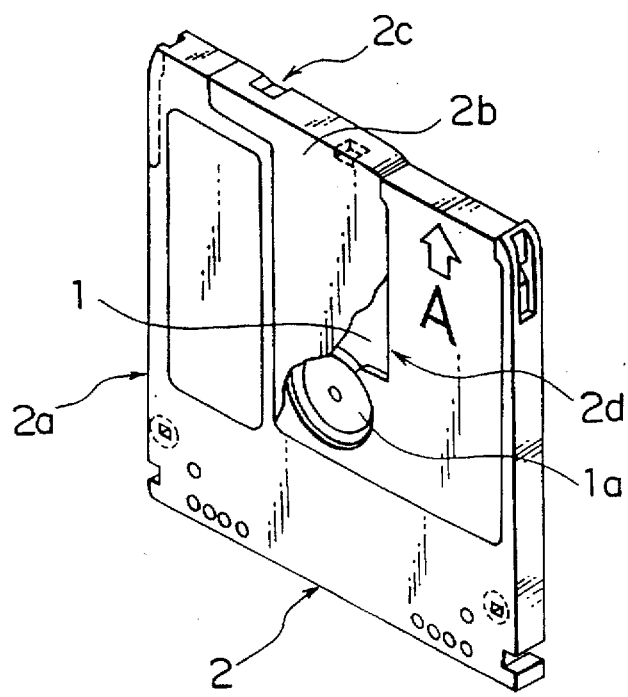
FIG. 4 is a partially broken perspective view showing the appearance of a cartridge into which the optical disk of FIG. 3 is stored.

FIG. 3 is a perspective view showing the appearance of a magnetooptic disk of 130 mm type (5.25 inch type). FIG. 4 is a partially broken perspective view showing the appearance of a cartridge into which the optical disk of FIG. 3 is stored. An access window 2d is approximately formed on each of both central faces of a cartridge 2. A shutter 2b for opening and closing the access window 2d is slidably attached to a cartridge body case 2a in a shape in which the shutter 2b is turned up with an end tip of the cartridge as a center. Biasing force for releasing the shutter 2b is applied to a cartridge end tip side of this shutter 2b. A slot 2c for a shutter opener is formed. The shutter 2b is biased at any time in a closing direction of the access window 2d. The recording medium 1 is stored into the cartridge 2. A hub 1a and a central hole 1b are formed in a central portion of the cartridge 2.

In the case of the magnetooptic disk cartridge 2 of 130 mm type (5.25 inch type), both faces of the disk can be accessed so that the above hub 1a is attached onto each of both cartridge faces. In contrast to this, in the case of the magnetooptic disk cartridge of 90 mm type (3.5 inch type), only one face of the disk is accessed so that the hub 1a is attached onto only one cartridge face.

The cartridge loading mechanism will next be explained with reference to FIGS. 1 and 2.

Figure 2:
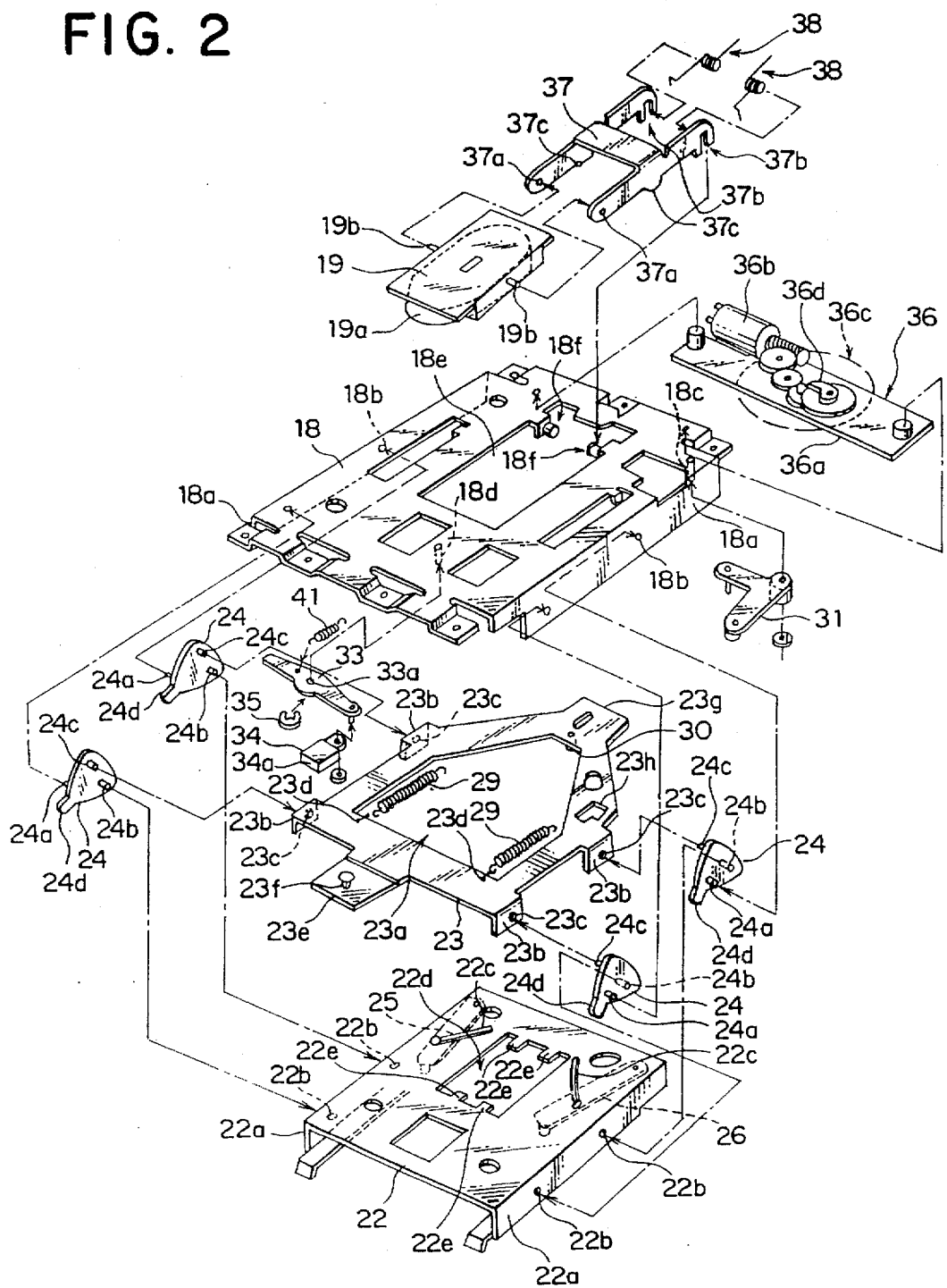
FIG. 2 is an exploded perspective view showing an internal structure of the cartridge loading mechanism in the first embodiment form of the present invention.

FIG. 2 is an exploded perspective view showing the construction of the cartridge loading mechanism in the first embodiment form of the present invention. A cartridge holder 22 holds the cartridge 2. A carrier 23 swings a cartridge holder 22. A swinging cam 24 connects the carrier 23 to the loading base 18.

A rising portion 18a is formed on each of both left-hand and right-hand sides of the loading base 18 by bending the loading base 18 in a vertical direction. The rising portion 18a is approximately formed in a U-shape seen from a front side of the cartridge loading mechanism. A hole 18b is formed in the rising portion 18a. The swinging cam 24 is rotatably attached to the loading base 18 by fitting a first shaft 24a into the hole 18b. The first shaft 24a is vertically attached onto one face of the swinging cam 24. A second shaft 24b and a third shaft 24c are formed on a face of the swinging cam 24 opposite to its one face on which the first shaft 24a is vertically formed. Axes of these three shafts 24a, 24b and 24c are parallel to each other and are located in different positions. A projection 24d extends from the swinging cam 24 in a radial direction of the first shaft 24a.

As shown in FIG. 2, the cartridge holder 22 is formed in a C-shaped box seen from the front side of the cartridge loading mechanism such that a central portion of the cartridge holder 22 on its lower face is opened. The cartridge holder 22 holds the cartridge 2 therearound. Holes 22b are formed in right-hand and left-hand bent portions 22a of the cartridge holder 22 for holding the cartridge 2 therearound. The second shaft 24b of the swinging cam 24 is fitted into each of the holes 22b. An arc groove 22c is formed on a planar face of the cartridge holder 22 on each of its both sides with respect to a central line of this cartridge holder. An opening portion 22d is approximately formed in a central portion of the cartridge holder 22 on its upper face. A claw portion 22e extends from each of one portions of edge portions of the opening portion 22d.

Two levers composed of a left-hand lever 25 and a right-hand lever 26 are rotatably attached to this cartridge holder 22. These two levers 25 and 26 are biased at any time in a discharging direction of the cartridge 2. A torsion coil spring or a tension coil spring, etc. are used as a biasing means of the cartridge 2.

Each of FIGS. 5a and 5b is a plan view showing the construction of the right-hand lever 26. A rotating shaft 27 rotatably supports one end portion of the right-hand lever 26. Reference numeral 28 designates a roller. A claw portion 26a is formed in a central portion of the right-hand lever 26. Reference numeral 26b designates a catcher. This catcher 26b is constructed by an inlet portion 26c and a groove portion 26d. The inlet portion 26c is formed by notching one portion between the claw portion 26a and the rotating shaft 27 on a rear side face of the right-hand lever 26 with respect to the cartridge 2. The groove portion 26d is continuously connected to this inlet portion 26c and is approximately formed in the direction of a central line of the right-hand lever 26 on a plane thereof. An L-shaped notch is formed in the right-hand lever 26 by this inlet portion 26c and the groove portion 26d.

The roller 28 is rotatably attached to another end portion of each of the left-hand lever 25 and the right-hand lever 26. The claw portion 26a formed in each of the left-hand lever 25 and the right-hand lever 26 is fitted into each of the arc grooves 22c, 22c (see FIG. 2) formed in the cartridge holder 22 so that positions of the left-hand lever 25 and the right-hand lever 26 in rotating directions thereof are restricted.

When the cartridge 2 is inserted into the above cartridge holder 22 in a state in which a B-face of the cartridge 2 is directed upward, the roller 28 at the end tip of the right-hand lever 26 is fitted into the slot 2c for a shutter opener (see FIG. 4) as shown in FIG. 5a. When the cartridge holder 22 is further pushed, the right-hand lever 26 is rotated as shown in FIG. 5b in a state in which the roller 28 is fitted into the slot 2c for a shutter opener (see FIG. 4). Thus, the shutter 2b (see FIG. 4) of the cartridge 2 is opened. When the cartridge 2 is inserted into the cartridge holder 22 in a state in which an A-face of the cartridge 2 is directed upward, the shutter 2b (see FIG. 4) is opened by the left-hand lever 25.

In FIG. 2, the carrier 23 is constructed by a plate-shaped member approximately formed in the shape of a home base and having a central opening portion 23a. A rising portion 23b is formed in the carrier 23 by vertically bending this carrier 23 on each of both left-hand and right-hand sides thereof. A hole 23c is formed in this rising portion 23b. The third shaft 24c of the swinging cam 24 is fitted into this hole 23c. A hole 23d for attaching a carrier spring 29 is formed at each of edges of the opening portion 23a on a front side of the carrier 23. The carrier 23 is biased by this carrier spring 29 at any time in an inserting direction of the cartridge 2.

A pin 23f for receiving an end tip of an ejecting lever 33 described later is attached to an extending portion 23e of the carrier 23 in a front central portion thereof. A roller 30 is formed in an extending portion 23g formed in a rear portion of the carrier 23. A notch 23h approximately has an L-shape and is formed on a plane of the carrier 23 in a right-hand side rear portion thereof. As shown in FIGS. 5a and 5b, this notch portion 23h is constructed by a vertical portion 23i, a straight line portion 23j and an inclining portion 23k. The vertical portion 23i extends in a vertical direction perpendicular to a cartridge inserting/discharging direction. The straight line portion 23j is continuously connected to this vertical portion 23i and extends in the cartridge discharging direction. The inclining portion 23k is formed in a boundary portion of the vertical portion 23i and the straight line portion 23j.

A latch 31 holds a position of the carrier 23 with respect to the loading base 18 when the cartridge is discharged. As shown in FIGS. 5a and 5b, this latch 31 is constructed by an approximately F-shaped latch plate 31a, a pin 31c, a roller 32 and a hole portion 31f. The pin 31c is vertically attached to an end portion of an extending piece 31b formed in a central portion of this latch plate 31a. The roller 32 is attached to one end portion of a horizontal extending piece 31d. The hole portion 31f is formed in another end portion of the horizontal extending piece 31d from which an extending piece 31e extends.

This latch 31 is rotatably held with respect to the loading base 18 by fitting the pin 18c attached to the loading base 18 into the hole portion 31f as shown in FIG. 2. Further, as shown in FIGS. 5a and 5b, the position of the carrier 23 with respect to the loading base 18 is held (latched) at the discharging time of the cartridge by fitting the roller 32 into the notch 23h of the carrier 23. The latch 31 is biased in the counterclockwise direction seen from above.

In FIGS. 6a and 6b, an emergency ejecting button 34 is rotatably connected to one end of an ejecting lever 33. A central portion of the ejecting lever 33 is rotatably supported by the loading base 18. The other end of the ejecting lever 33 is located behind the pin 23f (see FIG. 2) of the carrier 23. A recessed bar contact portion 34a is formed at an end tip of this emergency ejecting button 34. This bar contact portion 34a receives an end tip of a bar (described later) as an operating member inserted into the drive unit at an emergency ejecting time. A hole 33a is approximately formed in the central portion of the ejecting lever 33. A pin 18d of the loading base 18 is fitted into this hole 33a and is stopped by an E-ring 35 so that the ejecting lever 33 is rotatably held by the loading base 18.

In FIG. 2, an ejecting unit 36 constitutes a mechanism for moving the carrier 23 upward and downward. This ejecting unit 36 is constructed by a base-substrate 36a, an ejecting motor 36b, a reduction gear train 36c, an ejecting cam 36d, etc. The ejecting motor 36b and the reduction gear train 36c are formed on the base substrate 36a. The ejecting cam 36d is formed at a final stage of this reduction gear train 36c. The ejecting unit 36 is fixed to the loading base 18 in at least two positions.

As shown in FIG. 2, the magnetic head 19 has a coil 19a for applying a bias magnetic field to the recording medium 1. A pin 19b is attached onto each of both right-hand and left-hand sides of the magnetic head 19. This pin 19b is fitted into a hole 37a formed in a magnetic head holder 37 so that the magnetic head 19 is rotatably attached to the magnetic head holder 37.

A U-shaped groove 37b is formed at each of rear ends of the magnetic head holder 37. A shaft 18f is formed in each of edge portions of an opening portion 18e formed in a central portion of the loading base 18. The magnetic head holder 37 is rotatably attached to the loading base 18 by fitting the groove 37b onto the shaft 18f from above. The magnetic head holder 37 is biased by a torsion coil spring 38 at any time in a downward direction, i.e., a loading direction of the cartridge. A projected portion 37c is projected on a lower side of the magnetic head holder 37.

A central coil portion of the torsion coil spring 38 is inserted onto the above shaft 18f. One end of the torsion coil spring 38 comes in contact with the magnetic head holder 37. The other end of the torsion coil spring 38 comes in contact with the loading base 18. Thus, the torsion coil spring 38 is attached to the magnetic head holder. At this time, it is sufficient to form each of the torsion coil spring 38, the shaft 18f, the groove 37b and the projected portion 37c of the magnetic head holder 37 in at least one position. A tension coil spring may be also used as a biasing means at this time. In this case, it is necessary to attach the tension coil spring in a direction approximately parallel to a vertical direction of the cartridge holder 22.

An operation of the cartridge loading mechanism in the first embodiment form at an inserting time of the cartridge will next be explained.

As shown in FIG. 7, when the cartridge 2 is inserted into a cartridge insertion port 8a formed on the front face 8 in the direction of an arrow A, the cartridge 2 is inserted into the cartridge holder 22 while the first door 6c of the front cover 6 is pushed and opened by the cartridge 2. Thus, as shown in FIGS. 5a and 5b, the roller 28 at an end tip of the right-hand lever 26 or the left-hand lever 25 (the right-hand lever 26 in FIGS. 5a and 5b) is fitted into the slot 2c for a shutter opener of the cartridge 2. When the cartridge 2 is further pushed, the right-hand lever 26 begins to be rotated in the direction of an arrow B. Accordingly, the shutter 2d is gradually opened in the direction of an arrow C (see FIG. 5a).

The pin 31c of the latch 31 passes through the inlet portion 26c of the catcher 26b constructed by an L-shaped notch formed in the right-hand lever 26. Then, the pin 31c comes in contact with a wall of the catcher 26b, i.e., a side face of the groove portion 26d. The latch 31 is biased from this time point through the pin 31c from the right-hand lever 26. Therefore, the latch 31 begins to be rotated in the direction of an arrow D. Thus, the roller 32 in a latching state with respect to the vertical portion 23i of the carrier 23 is rotated on the notch 23h.

When the latch 31 begins to be rotated, the roller 32 also begins to be rotated. When the roller 32 is then rotated until a position exceeding an edge 23l of the vertical portion 23i and the inclining portion 23k, the latching state of the roller 32 and the vertical portion 23i is released. Thus, no restraining force with respect to biasing of the carrier 23 in the A-direction at any time is applied to the carrier 23 so that the carrier 23 begins to be moved in the A-direction. The roller 32 is pushed by the inclining portion 23k just after this movement of the carrier A. Therefore, the catcher 26b is further rotated so that the pin 31c begins to be moved into a deeper portion of the groove portion 26d of the catcher 26b. At this time, the carrier 23 is further moved in the A-direction by moving the inclining portion 23k of the notch 23h by the roller 32. When the roller 32 is moved to the straight line portion 23j of the notch 23h, the roller 32 is engaged with an end portion of the notch 23h as shown in FIG. 5b. The latch 31 is thus stopped against biasing of the carrier springs 29 (see FIG. 2).

Since the pin 31c is simultaneously fitted into the groove portion 26d of the catcher 2ob, no right-hand lever 26 is returned in a biasing direction so that the rotation of the right-hand lever 26 is stopped. Namely, the right-hand lever 26 is chucked. The claw portion 26e is formed at an end tip of the right-hand lever 26. An end tip of the left-hand lever 25 is pressed by this claw portion 26e so that the rotation of the left-hand lever 25 is also stopped.

Further, as shown in FIG. 2, the third shaft 24c of the swinging cam 24 is fitted into the hole 23c of the carrier 23. The first shaft 24a of the swinging cam 24 is fitted into the hole 18b of the loading base 18. Therefore, as shown in FIG. 7, when the carrier 23 begins to be moved in the cartridge inserting direction (in the A-direction), the swinging cam 24 begins to be rotated in the direction of an arrow E. The second shaft 24b of the swinging cam 24 is fitted into the hole 22b of the cartridge holder 22. Therefore, the cartridge holder 22 is lowered in a state in which the cartridge 2 is stored into the cartridge holder 22.

When the cartridge 2 is stored into the cartridge holder 22, the shutter 2b (see FIG. 4) is completely opened by the right-hand lever 26 (see FIG. 2) or the left-hand lever 25 (see FIG. 2). Therefore, the hub 1a (see FIG. 3) is exposed from the access window 2d (see FIG. 4). When the cartridge holder 22 is lowered, the hub 1a (see FIG. 4) is engaged with an end tip of the spindle motor 13 so that the recording medium 1 (see FIG. 4) is chucked by the spindle motor 13.

When the cartridge holder 22 has been completely lowered, the cartridge 2 is close onto the reference pin 3e (see FIG. 1) and is positioned.

In FIG. 2, the projected portion 37c formed in the magnetic head holder 37 comes in contact with an upper face of the cartridge holder 22 so that the magnetic head 19 attached to the loading base 18 is located above the cartridge holder 22. However, as the cartridge holder 22 is lowered by releasing the latch, the magnetic head 19 is also lowered by biasing of the torsion coil spring 38. When the magnetic head 19 is lowered, a lower face of the magnetic head 19 comes in contact with the claw portion 22e of the cartridge holder 22. When the magnetic head 19 is further lowered, the magnetic head 19 comes in close contact with the claw portion 22e. Thus, the magnetic head 19 is positioned in its height direction.

Each of FIGS. 8a to 8c is an explanatory view showing positions of the lever 21 and the swinging cam 24 in an unloading state of the cartridge when the latch is released.

As shown in FIG. 8a, the projection 24d of the swinging cam 24 comes in contact with the cam portion A21b of the lever 21 until a releasing time point of the latch. Therefore, the groove portion 21f at an end tip of the lever 21 is stopped in a lowermost position. The second door 6d is also located in its lowest position. Namely, the second door 6d is in a state in which the cartridge insertion port 6b is completely opened.

In this state, when the latch 31 (see FIG. 5a) is released and the swinging cam 24 begins to be rotated, an end tip of the projection 24d is gradually moved toward the cam portion B21c from the cam portion A21b. When the swinging cam 24 is rotated about ⅔ times a total rotating angle thereof, the projection 24d is disengaged from the cam portion A21b as shown in FIG. 8b so that the projection 24d is moved into a range of the cam portion B21c. At this time, the lever 21 is biased at any time in a direction in which an end tip portion of the lever 21 is raised. Accordingly, the lever 21 begins to be raised and the second door 6d also begins to be raised. At this time, the cartridge 2 is already lowered approximately about ⅔ times a total loading stroke. Therefore, when the cartridge 2 has been completely lowered, the projection 24d is engaged with the notch portion 21d so that the rotation of the swinging cam 24 is stopped.

At this time point, the projection 24d is rotated until a range of the notch portion 21d through the range of the cam portion B21c as shown in FIG. 8c. Accordingly, the lever 21 is completely raised so that the cartridge insertion port 6b is completely closed by the second door 6d.

The loading operation of the cartridge has been completed in accordance with the above procedures.

An ejecting operation of the cartridge will next be explained.

In FIG. 1, the ejecting switch 39 is turned on by pushing the ejecting button 8b by an operator. Thus, commands for starting the ejecting motor 36b (see FIG. 2) are outputted from the main substrate 11 so that the ejecting motor 36b (see FIG. 2) begins to be rotated. As shown in FIG. 9, the ejecting cam 36d then begins to be rotated in the direction of an arrow F. Then, the ejecting cam 36d pushes the roller 30 of the carrier 23. Thus, the carrier 23 is moved in a discharging direction (the direction of an arrow A') of the cartridge against biasing force of the carrier springs 29 (see FIG. 2). In this case, as shown in FIG. 7, the swinging cam 24 begins to be rotated in a direction opposite to a loading direction, i.e., in the direction of an arrow E' so that the cartridge holder 22 begins to be raised. Accordingly, the cartridge 2 also begins to be raised.

When the swinging cam 24 begins to be further rotated, the projection 24d comes in contact with the cam portion B21c as shown in FIG. 8c. Further, the projection 24d begins to push the lever 21. When the cam portion B21c is pushed, rotating torque is applied to the lever 21 in a direction opposite to that of biasing force of the torsion spring 20. Therefore, the lever 21 begins to be rotated in this opposite direction, i.e., on a lower side. As a result, as shown in FIG. 8b, the second door 6d begins to be lowered so that the cartridge insertion port 6b begins to be opened.

When the swinging cam 24 is further rotated, the projection 24d is moved into the range of the cam portion A21b as shown in FIG. 8a. At this time, the swinging cam 24 has been rotated until a position in which the lever 21 is completely lowered. Simultaneously, the second door 6d is opened so that the cartridge insertion port 6b is completely opened.

At this time, the swinging cam 24 is moved along a path reverse to that at the loading time of the cartridge. Accordingly, the swinging cam 24 is returned only about ⅓ times a total rotating angle thereof. Accordingly, the cartridge holder 22 is also raised only about ⅓ times a total stroke thereof. However, when the cartridge holder 22 is raised to a certain extent, an inside face of the cartridge 2 raises a lower face of the recording medium 1 so that chucking of the hub 1a (see FIGS. 3 and 4) and the spindle motor 13 (see FIG. 1) is released.

With respect to an upper portion of the cartridge holder 22 shown in FIG. 2, the magnetic head 19 is pushed by the claw portions 22e and is raised as the cartridge holder 22 is raised. When the magnetic head 19 is raised to a certain extent, the projected portion 37c of the magnetic head holder 37 comes in contact with an upper face of the cartridge holder 22. When the magnetic head 19 is further raised, the magnetic head 19 comes in contact with the upper face of the cartridge holder 22. When the magnetic head 19 is further raised, the cartridge holder 22 pushes up the projected portion 37c so that the magnetic head 19 is raised from the cartridge holder 22.

When the ejecting cam 36d further continuously pushes the carrier 23, a contact portion of the notch portion 23h coming in contact with the roller 32 of the latch 31 is moved from the straight line portion 23j to the inclining portion 23k as shown in FIGS. 5a and 5b so that the edge 23l is moved to a position of the roller 32. At this time, the cartridge 22 is approximately raised until the height of a discharging position. When the edge 23l exceeds the position of the roller 32, the roller 32 is moved into the vertical portion 23i by biasing force applied to the latch 31 so that the latch 31 begins to be rotated at once.

When the latch 31 begins to be rotated, an engaging state between the groove portion 26d of the catcher 26b and the pin 31c of the latch 31 is released. Accordingly, the right-hand lever 26 begins to be rotated at once with biasing force applied to this right-hand lever 26. Similarly, the left-hand lever 25 begins to be rotated at once since an engaging state between the left-hand lever 25 and the claw portion 26e of the right-hand lever 26 is released. As a result, the cartridge 2 is pushed out so that the cartridge 2 is discharged from the cartridge insertion port 6b (see FIG. 1) in the direction of the arrow A'.

Just after the cartridge 2 has been discharged, the ejecting cam 36d (see FIG. 2) pushes an unillustrated stopping switch. Thus, commands for stopping the operation of the ejecting motor 36b (see FIG. 2) are outputted from the main substrate 11 (see FIG. 1). Accordingly, the rotation of the ejecting motor 36b (see FIG. 2) is stopped so that the ejecting operation of the cartridge has been completed.

An emergency ejecting function of the cartridge loading mechanism will next be explained with reference to FIGS. 6 and 10.

When stoppage of electric power supply, etc. are caused in a loading state of the cartridge, no ejecting motor can be rotated. Accordingly, it is necessary to provide an emergency ejecting function for the cartridge loading mechanism.

As shown in FIG. 10, a bar 40 such as a piano wire or a driver having a thin end, etc. is first inserted into the small hole 8c formed on the front face 8 to perform an emergency ejecting operation. At this time, the small hole 6f is similarly formed in the front cover 6. Accordingly, the bar 40 is inserted into the interior of the drive unit. When the bar 40 is further inserted, an end tip of the bar 40 comes in contact with a bar contact portion 34a of the emergency ejecting button 34. When the bar 40 is further pushed, the ejecting lever 33 is rotated. Thus, an end tip of the ejecting lever 33 is moved in the cartridge discharging direction (the unloading direction) so that this end tip of the ejecting lever 33 pushes the pin 23f of the carrier 23. A subsequent operation is similar to that in the explanation of the cartridge ejecting operation. Therefore, this operation is omitted in the following description. The ejecting lever 33 is normally biased by a tension spring 41 in the clockwise direction in FIG. 10. Accordingly, no end tip of the ejecting lever 33 comes in contact with the pin 23f so that no loading and ejecting operations of the cartridge are prevented by the ejecting lever 33.

In accordance with the above first embodiment form, the carrier 23 in the cartridge loading mechanism is arranged on an upper side of the cartridge holder 22. Accordingly, it is possible to release a space generally occupied by the carrier on a lower side of the cartridge holder 22. Therefore, a dustproof structure as a perfect sealing structure can be provided. Further, it is possible to solve a problem of the general technique in which it is difficult to make the drive unit thin.

The carrier 23 is arranged on the upper side of the cartridge holder 22 so that it is considered that no space for this upper side is used. However, only the magnetic head 19 is laid out on the upper side of the cartridge holder 22. Therefore, there is no constructional element outside the magnetic head 19. Accordingly, a space for the cartridge loading mechanism can be more effectively utilized in the first embodiment form.

The above explanation relates to the first embodiment form. The first embodiment form uses a mechanism for moving the cartridge holder 22 by the swinging cam 24 from above to below. Therefore, the carrier 23 is biased in a direction opposite to that in the general technique. Namely, the carrier 23 is biased in the inserting direction of the cartridge when the cartridge is loaded. Accordingly, the carrier 23 must be biased in the discharging direction of the cartridge to perform the emergency discharging operation so that the ejecting lever 33 is required. Therefore, the number of parts of the cartridge loading mechanism is increased and a stopper such as an E-ring, etc. is required so that the number of assembly works is increased.

Further, in the first embodiment form, the ejecting lever 33 must be pushed from the exterior of the drive unit at the emergency discharging time of the cartridge. However, no pressing portion of the ejecting lever 33 can be exposed to the exterior of the drive unit in view of the emergency discharge. Therefore, the small hole 8c is formed on the front face 8. The discharging operation is performed by inserting the bar 40 such as a piano wire, a driver having a thin end, etc. into this small hole 8c and pressing the internal ejecting lever 33. At this time, it is desirable to attach the emergency ejecting button 34 to an end tip of the ejecting lever 33 such that the bar 40 externally inserted can reliably press the end tip of the ejecting lever 33. However, the number of parts of the cartridge loading mechanism is increased in this case so that there is a problem about an increase in the number of assembly works. Further, as shown in FIG. 6b, a backlash space for moving the emergency ejecting button 34 in a vertical direction (H-direction) with play must be secured. Therefore, no magnetooptic disk unit can be made thinner. Further, a vertical position of the emergency ejecting button 34 becomes inaccurate by this backlash. Therefore, after the bar 40 is inserted into the small hole, there is a case in which no end tip of the bar 40 is accurately positioned at an end tip of the emergency ejecting button 34 so that operability of the bar 40 is reduced.

The following second embodiment form of the present invention solves such a problem.

Each of FIGS. 11a and 11b is a perspective view showing a cartridge emergency ejecting mechanism in accordance with the second embodiment form of the present invention. In a loading base 50, an attaching portion 50a for attaching an emergency ejecting button 51 described later is formed in the loading base 18 in the first embodiment form and a stepped pin 50d for attaching an ejecting lever 52 described later is vertically attached to the loading base 18 in the first embodiment form. This attaching portion 50a is constructed by a notch portion 50b and a stepped claw portion 50c as a supporting portion of an ejecting button extending from each of both sides of this notch portion 50b. The stepped pin 50d is constructed by a shaft portion 50e and a head portion 50f having a diameter larger than that of this shaft portion 50e and formed at an end tip of the shaft portion 50e. The same constructional members as the first embodiment form are designated by the same reference numerals in FIGS. 11a and 11b and a detailed explanation thereof is omitted in the following description.

Reference numeral 52 designates an ejecting lever. A hole 52a is formed in a central portion of a body of the ejecting lever 52. This hole 52a is constructed by a hole portion 52b and an elongated hole portion 52c. The above head portion 50f can pass through the hole portion 52b. The elongated hole portion 52c is continuously and integrally formed with this hole portion 52b. The shaft portion 50e can be fitted into the elongated hole portion 52c. A step is formed in one end portion of the body of the ejecting lever 52. A lever pin 52d is vertically attached to an end tip portion of this step of the ejecting lever 52. A tension spring 41 is attached to another end portion of the ejecting lever 52.

Reference numeral 51 designates an emergency ejecting button. This emergency ejecting button 51 has a sliding groove 51a formed in the same direction as a pressing direction of the emergency ejecting button 34 on each of both sides of the emergency ejecting button 34 in the first embodiment form. The claw portion 50c is fitted into this sliding groove 51a. A hole 51b is formed in an extending portion extending from a rear face of the emergency ejecting button 51. A central axis of this hole 51b is perpendicular to the pressing direction of the emergency ejecting button 51. An end tip of a bar 40 (see FIG. 10) comes in contact with a bar contact portion 51c.

The ejecting lever 52 is rotatably attached to the above stepped pin 50d through the hole 52a. Further, the lever pin 52d is inserted into the hole 51b of the emergency ejecting button 51. A biasing direction of the tension spring 41 is approximately in conformity with the direction of an axis directed from a center of the hole portion 52b to a center of the elongated hole portion 52c. The biasing direction of the tension spring 41 is also approximately in conformity with a biasing direction of the carrier 23 when the cartridge is loaded.

In such a construction, the ejecting lever 52 is attached to the loading base 50 by only inserting the stepped pin 50d into the hole portion 52b. Therefore, it is not necessary to particularly perform a fastening operation of a cut washer or E-ring stoppage, etc. Further, it is sufficient to fit the lever pin 52d into the hole 51b when the emergency ejecting button 51 is attached to the ejecting lever 52. Accordingly, it is not necessary to perform the fastening operation such as screw stoppage or E-ring stoppage, etc. Therefore, the effects in the first embodiment form can be obtained while an increase in the number of assembly works is minimized. Further, the claw portion 50c of the loading base 50 is slidably fitted into the sliding groove 51a so that backlash of the emergency ejecting button 51 in a vertical direction is constructed by only backlashes of the sliding groove 51a and the claw portion 50c. Accordingly, the backlash of the emergency ejecting button 51 in the vertical direction can be reduced so that no operability of the bar 40 can be reduced.

A cartridge loading mechanism in accordance with a third embodiment form of the present invention will next be explained.

In the first embodiment form, as shown in FIGS. 2 and 12, the carrier 23 is arranged on the upper side of the cartridge holder 22 so that the ejecting lever 33 and the emergency ejecting button 34 are also arranged on the upper side of the cartridge holder 22. At this time, the emergency ejecting button 34 is located in a position higher than that of the first door 6c such that no bar 40 inserted into the interior of the drive unit at the emergency discharging time of the cartridge is interfered with the first door 6c completely opened at the discharging time (or the inserting time) of the cartridge 2. Therefore, no drive unit can be structurally made thin.

Further, in the first embodiment form, as shown in FIG. 2, the carrier 23 is arranged on the upper side of the cartridge holder 22 so that the ejecting lever 33 is also arranged on the upper side of the cartridge holder 22. In this relation, a basket body of the drive unit is divided into two sections composed of the loading base 18 on an upper side and the base plate 3 on a lower side. The basket body has a structure in which the carrier 23, the cartridge holder 22, the swinging cam 24 and the ejecting lever 33 are attached to the loading base 18 on the upper side. At this time, it is desirable to fasten the loading base 18 and the base plate 3 to each other on the upper side in view of a dustproof structure. Therefore, as shown in FIG. 1, the loading base 18 is fixed by screws in four corner screw stopping portions 3f formed in columnar portions 3b of the base plate 3. There is particularly no problem about assembly of both the loading base 18 and the base plate 3 since there is a sufficient space in each of two positions on the rear side of the drive unit. However, there is the first door 6c in two positions on the front side of the drive unit. Therefore, it is necessary to arrange the loading base 18 in height positions of the screw stopping portions 3f so that no drive unit can be structurally made thin.

The following third embodiment form of the present invention is provided in consideration of such problems.

FIG. 13 is a side view showing the construction of the cartridge loading mechanism near a cartridge insertion port in the third embodiment form. FIG. 14 is a perspective view showing the constructions of a front cover and a first door shown in FIG. 13. Reference numeral 55 designates a first door in the third embodiment form. A projected portion 55a is formed in each of both end portions of the first door 6c in the first embodiment form. An end tip of the cartridge 2 comes in contact with the projected portion 55a. A recessed portion 55b is formed on a back side of the projected portion 55a. A groove portion 55c is formed on a back face of the first door 6c in the first embodiment form. Namely, the first door 55 in the third embodiment form is constructed such that the first door 6c in the first embodiment form has the projected portion 55a, the recessed portion 55b and the groove portion 55c. The same constructional members as the first embodiment form or constructional members each having the same function as the first embodiment form are designated by the same reference numerals and a detailed explanation thereof is omitted in the following description.

In the third embodiment form, an emergency ejecting button 34 is arranged behind a free end of the first door 55 when the first door 55 is completely opened. At this time, the groove portion 55c is approximately formed in parallel with a line connecting a small hole 6f of the front cover 6 to a bar contact portion 34a of the emergency ejecting button 34 such that this groove portion 55c is located vertically below this line.

A screw stopping portion 3f for the loading base 18 is formed in each of four corners of the base plate 3. When the first door 55 is completely opened at the inserting or discharging time of the cartridge 2, the recessed portion 55b and the projected portion 55a are located vertically below two front screw stopping portions 3f among the four corner screw stopping portions 3f.

As mentioned above, in the third embodiment form, the emergency ejecting button 34 is arranged after the first door 55. Further, the groove portion 55c is formed on a back face of the first door 55. Accordingly, the bar 40 inserted into the interior of the drive unit is fitted into this groove portion 55c at an emergency discharging time of the cartridge. Therefore, the effects in the first embodiment form can be obtained without preventing the drive unit from being made thin.

When the first door 55 is completely opened, a position of the projected portion 55a is in conformity with the position of a front screw stopping portion 3f. Further, the recessed portion 55b is formed on a back face of the projected portion 55a. Accordingly, an end tip of a screw projected from the screw stopping portion 3f and a back side of the screw stopping portion 3f is fitted into the recessed portion 55b even when the screw stopping portion 3f is lowered to the same height position as the first door 55 and the first door 55 is completely opened at the inserting or discharging time of the cartridge. Therefore, the screw and the first door 55 are not interfered with each other so that the drive unit can be made thin.

A cartridge loading mechanism in accordance with a fourth embodiment form of the present invention will next be explained.

In FIGS. 8a to 8c, when the second door 6d is in an open state, a position of the second door 6d is determined by the relation in position between the second door 6d and the groove portion 21f at the end tip of the lever 21. However, there is scatter in relative positions of the projection 24d and the cam portion A21b. Therefore, there is also scatter in vertical position of the groove portion 21f. At this time, if a lower end of the second door 6d is laid out in the same position as an inner side of the front cover 6, no second door 6d is lowered any more so that the projection 24d and the cam portion A21b are interfered with each other. Accordingly, no swinging cam 24 can be rotated so that no cartridge 2 can be loaded.

Therefore, it is necessary to form a clearance by scatter "a" from the inner side of the front cover 6 at the lower end of the second door 6d even in a lowermost position of the groove portion 21f. This clearance prevents the drive unit from being made thin.

The following fourth embodiment form of the present invention is provided to solve such a problem.

FIG. 15a shows a lever in the fourth embodiment form. A constricted portion 21g is approximately formed in a central portion of the lever 21. Namely, the lever in the fourth embodiment form is provided by approximately forming a constricted portion in a central portion of the lever 21 in the first embodiment form. The same constructional members as the first embodiment form or constructional members each having the same function as the first embodiment form are designated by the same reference numerals and a detailed explanation thereof is omitted in the following description.

In such a fourth embodiment form, since the constricted portion 21g is formed in the lever 21 in the first embodiment form, the constricted portion 21g is resiliently deformed even when the nominal position of a lower end of the second door 6d is laid out in the same position as an inner side of the front cover 6. Accordingly, the constricted portion 21g absorbs scatter in position of the groove portion 21f. Therefore, it is possible to solve the disadvantage that no swinging cam 24 can be rotated.

As shown in FIG. 15b, the above-mentioned effects are also obtained even when a notch portion 21h is formed such that this notch portion 21h surrounds a peripheral portion of a shaft 21a from an outer side of the lever 21. Further, a spring constant can be reduced in comparison with the lever shown in FIG. 15a. Therefore, it is possible to more reliably solve the problem that no swinging cam 24 can be rotated.

A cartridge loading mechanism in accordance with a fifth embodiment form of the present invention will next be explained.

As shown in FIG. 16, the lever 21 is formed just inside a dust cover 17 in each of left-hand and right-hand directions just after the front cover 6. Therefore, no screw stopping portion of the dust cover 17 can be formed just after the front cover 6. Accordingly, the dust cover 17 and the front cover 6 do not come in close contact with each other in a position near the lever 21 so that external dust tends to enter the cartridge loading mechanism.

The following fifth embodiment form of the present invention is provided to solve such a problem.

FIG. 17 shows a lever 21 in the fifth embodiment form. An escaping portion 21i of an arch type is provided by partially forming an approximately central portion of the lever 21 in the first embodiment form in an angular shape on an upper side. The same constructional members as the first embodiment form or constructional members each having the same function as the first embodiment form are designated by the same reference numerals and a detailed explanation thereof is omitted in the following description.

In such a fifth embodiment form, the escaping portion 21i is formed in the lever 21 as shown in FIG. 18. Therefore, a screw stopping portion 17a of the dust cover 17 can be formed in a position corresponding to this escaping portion 21i. Further, when a sectional width of the lever 21 in the escaping portion 21i is set to be narrowed in comparison with the other portions of the lever 21, this narrowed portion tends to be resiliently deformed so that effects equal to those in the fourth embodiment form can be obtained.

A sixth embodiment form of the present invention will next be explained.

In Japanese Patent Application Laying Open (KOKAI) No. 3-108154, a swinging cam is used as a well-known example of a typical cartridge loading mechanism in a magnetooptic disk unit so as to secure dustproof performance by a perfect sealing structure as described in the prior art.

In this example, a stable cartridge loading mechanism having high dustproof performance can be achieved by a small number of constructional parts. However, in this example, a tray 101 is attached to a basket body 100 after a carrier and a cam 102 are attached to the basket body 100. Therefore, it is necessary to fit the tray 101 into the basket body 100 while the cam 102 is flexed outside by the tray 101 (see FIG. 19).

At this time, plastic such as polyacetal, etc. is used as a material of the cam 102 in consideration of slidability. A thickness of this plastic is relatively thin. Therefore, the cam 102 is deformed when flexure of the cam at this fitting time is left as it is. When a fitting amount (projecting amount) of the cam to the tray 101 on an acting axis 102b of the cam is reduced to easily fit the cam into the tray, an engaging amount of the cam and the tray is reduced. Therefore, the cam is disengaged from the tray during an unloading operation of the cartridge so that no cartridge can be accurately loaded and unloaded.

The following sixth embodiment form of the present invention is provided to solve such a problem.

FIG. 20 is a perspective view showing the construction of a loading base in the sixth embodiment form. Reference numeral 56 designates a loading base in the sixth embodiment form. A tongue portion 56a is a bent portion for attaching a swinging cam 24 to the loading base 18 in the first embodiment form. A bent portion 56b is formed by bending processing together with the tongue portion 56a and is adjacent to this tongue portion 56a. The tongue portion 56a and the bent portion 56b are separated from each other in bending processing portions.

In such a sixth embodiment form, as shown in FIG. 21, only the tongue portion 56a formed in the loading base 56 is flexed when a cartridge holder 22 is attached to the swinging cam 24. Accordingly, different from the general cartridge loading mechanism, it is not necessary to flex the swinging cam 24 so that no swinging cam 24 is deformed. Further, a projecting size of a second shaft 24b can be set such that loading and unloading operations of the cartridge are performed without any problems.

A seventh embodiment form of the present invention will next be explained.

In the first or sixth embodiment form, the first shaft 24a formed in the swinging cam 24 is inserted into the hole 18b of the loading base. This hole 18b is formed by press working in consideration of mass production and contents in which the loading base is formed by a sheet metal such as an iron plate, etc. Therefore, as shown in FIG. 22, sections of the hole 18b are constructed by a breaking sectional face 60 and a shearing sectional face 61.

Accordingly, a side face of the first shaft 24a first comes in contact with only the shearing sectional face 61 having a small surface roughness so that no problem is caused. However, when wear of a wall portion of the hole 18b progresses by repeating the loading and unloading operations of the cartridge, the side face of the first shaft 24a soon comes in contact with the breaking sectional face 60. Accordingly, when a certain time point has passed, a wearing amount of the wall portion is suddenly increased so that no attaching-detaching life of the cartridge can be extended.

The following seventh embodiment form of the present invention is provided to solve such a problem.

FIG. 23 is a view showing the construction of a main portion of a cartridge loading mechanism in the seventh embodiment form. A pin 57 is attached to a portion corresponding to the hole 18b of the loading base 18. Reference numeral 58 designates a swinging cam in the seventh embodiment form. This swinging cam 58 has a hole 59 formed in a portion corresponding to the first shaft 24a of the swinging cam 24 in the first embodiment form. The pin 57 is fitted into this hole 59 so that the swinging cam 58 is rotatably attached to the loading base 18.

In such a seventh embodiment form, the pin 57 is arranged instead of the hole 18b of the loading base 18 and the hole 59 is formed instead of the first shaft 24a of the swinging cam 24. Accordingly, the pin 57 having a high surface roughness accuracy is uniformly slid within the hole 59 so that no wear of the swinging cam 24 is increased from a certain time point. Thus, the attaching-detaching life of the cartridge can be greatly extended. A projecting amount b of the pin 57 onto an outer side of the loading base 18 is about 0.2 mm at most and can be reduced in comparison with a projecting amount of the first shaft 24a. Accordingly, the drive unit can be made compact in a width direction thereof.

An eighth embodiment form of the present invention will next be explained.

FIG. 24 is an exploded perspective view showing a main portion of a cartridge loading mechanism in the eighth embodiment form. A face member 110 has a cartridge insertion port 110a on a front face of the cartridge loading mechanism. A second door 111 is moved upward and downward in a rear portion of the face member 110 to open and close the cartridge insertion port 110a. A first door 112 is rotated in the rear portion of the face member 110 to open and close the cartridge insertion port 110a. A front cover 113 having a frame shape rotatably supports the first door 112. A torsion spring 114 biases the first door 112 on a side of the cartridge insertion port 110a at any time. A lever 115 moves the second door 111 upward and downward. In FIG. 24, the same members as the first embodiment form shown in FIG. 1 are designated by the same reference numerals and a detailed explanation of these members is omitted in the following description.

This eighth embodiment form relates to a peripheral structure of the cartridge insertion port on a front side of the cartridge loading mechanism in the first embodiment form. As shown in FIG. 24, an extending portion 111a extends in a vertical direction at each of both ends of the second door 111. A boss 111b is vertically formed on a face of this extending portion 111a in parallel with a longitudinal direction of the second door 111. The second door 111 has the same basic construction as the second door 6 in the first embodiment form, but the boss 111b is located in a position higher than that of the boss 6e (see FIG. 1). Further, the lever 115 has the same basic construction as the lever 21 in the first embodiment form, but is formed in a shape set such that the groove portion 21f (see FIG. 1) at an end tip of the lever 21 is located in alignment with the position of the boss 111b.

Supporting pieces 112a and 112a hang down from both longitudinal end portions of the first door 112 on a face thereof opposed to the front cover 113. Bosses 112b and 112c are vertically formed on both faces of the supporting pieces 112a and 112a in parallel with a longitudinal direction of the first door 112. As shown in FIG. 24, the boss 112b is directed outside and the boss 112c is directed inside. Further, grooves 112d and 112d are respectively formed in one portions of the first door 112 located on sides of the supporting pieces 112a and 112a above the bosses 112c and 112c.

Elongated holes 113a and 113a are formed in a direction perpendicular to a bottom face of the front cover 113 on both inner side faces thereof on the side of a front opening portion of the front cover 113. Grooves 113b and 113b are formed in lower side edge portions of the front opening portion of the front cover 113 on sides of these elongated holes 113a and 113a.

The first door 112 is rotatably mounted to the front cover 113 by fitting and inserting the bosses 112b and 112b into the respective elongated holes 113a and 113a of the front cover 113. A coil portion 114a of the torsion spring 114 is inserted into each of the bosses 112c and 112c. One end portions 114b and 114b are respectively engaged with the grooves 112d and 112d. The other end portions 114c and 114c come in contact with a lower face of the front cover 113 or a lower face of the base plate 3, etc.

Each of FIGS. 25a to 25d is a cross-sectional view showing an internal structure of the main portion of the cartridge loading mechanism in the eighth embodiment form. FIG. 25a shows an arranging state of the cartridge loading mechanism before a cartridge is inserted into the cartridge loading mechanism. The front cover 113 is attached between a base plate 3 and a dust cover 17. Further, the face member 110 is attached to the cartridge loading mechanism. At this time, the second door 111 is arranged between the front cover 113 and the face member 110 such that the second door 111 can be moved upward and downward. The first door 112 comes in contact with the face member 110 by biasing of the torsion spring 114 so that the cartridge insertion port 110a is covered with the first door 112. At this time, the second door 111 is located below the first door 112.

An operation of the cartridge loading mechanism in this eighth embodiment form will next be explained.

When the cartridge 2 is inserted into the cartridge insertion port 110a, the first door 112 is rotated in the clockwise direction against the biasing of the torsion spring 114 by pressing of the cartridge 2 with the boss 112b as an axis as shown in FIG. 25b. When the cartridge 2 is mounted to the cartridge holder 22 (see FIG. 8), the cartridge 2 begins to be moved downward as shown in FIG. 25c and the first door 112 is correspondingly pressed downward. The boss 112b is moved downward along an elongated hole 113a. After the cartridge 2 is chucked as shown in FIG. 25d, the second door 111 is moved upward and the cartridge insertion port 110a is closed. An operation of the second door 111 for closing the cartridge insertion port 110a is similar to that in the case of the first embodiment form shown in FIG. 8. Therefore, an explanation of this operation is omitted here.

In accordance with the eighth embodiment form constructed above, a center of rotation of the first door 112 is located below the position of the cartridge insertion port 110a. Therefore, when the cartridge 2 is inserted into a cartridge holder, the first door 112 is rotated on a lower side and is located on a lower face side of the cartridge holder so that a space located on an upper side of the cartridge holder can be further reduced.

When the cartridge is inserted and the second door 111 is located on the central axis of a small hole 110b of the face member 110 formed for an emergency discharge of the cartridge, it is preferable to form a notch in a corresponding portion of the second door 111. In this case, a cutting amount of the second door 111 can be reduced in comparison with the length of a groove formed in the first door 55 as in the third embodiment form shown in FIGS. 13 and 14.

In the construction of the cartridge loading mechanism in the eighth embodiment form, the elongated holes 113a and 113a are integrally molded with the front cover 113. The front cover 113 and the first door 112 constitute a structural body so that a sufficient strength is required for each of the front cover 113 and the first door 112 although the front cover 113 and the first door 112 are thin. Therefore, each of the front cover 113 and the first door 112 is formed by an engineer plastic material having a large mechanical strength such as polycarbonate, ABS resin, etc. However, a sliding property of each of these materials is generally bad. Accordingly, when the cartridge is repeatedly loaded and unloaded many times, a mutual friction coefficient of the front cover 113 and the first door 112 is increased so that there is a fear of a reduction in movement of each of the front cover 113 and the first door 112.

This problem is solved in the following ninth embodiment form.

FIG. 26 is a perspective view showing the construction of a front cover as a main portion of the ninth embodiment form. Reference numerals 120 and 121 respectively designate the front cover and a door guide. The ninth embodiment form is constructed such that portions of the front cover 113 constituting elongated holes 113a and 113a in the eighth embodiment form are detachably attached and can be exchanged.

In FIG. 26, a recessed portion 120a is formed on a lower side of each of both inner sides of the front cover 120, i.e., in a root portion of each of these both inner sides. The recessed portion 120a is also formed in one portion of an edge portion of an opening portion on a front side of the front cover 120. Further, the recessed portion 120a is further formed within a stepped portion 120b formed in an outer lower side portion of the front cover 120. The door guide 121 is formed in a T-shape seen from a front side. The door guide 121 is constructed by a horizontal plane portion 121a and a vertical plane portion 121b vertically formed in the center of the horizontal plane portion 121a. An elongated hole 121c corresponding to the elongated hole 113a (see FIG. 24) in the seventh embodiment form is formed in the vertical plane portion 121b. The door guides 121 and 121 are arranged on both sides of the front cover 120 by fitting the horizontal plane portion 121a into the recessed portion 120a. A material of the door guides 121 is suitably constructed by resin having a high sliding property such as polyacetal, nylon, etc.

In such a construction, peripheral portions of the elongated holes 121c and 121c can be constructed by a high sliding property member so that a sliding property of the first door 112 with respect to the boss 112b (see FIG. 24) is improved. Further, since the door guides 121 can be detachably attached to the front cover 120, the door guides 121 are assembled into the front cover 120 in a state in which the boss 112b (see FIG. 24) of the first door 112 is fitted and inserted into the elongated hole 121c. Accordingly, no assembly efficiency of the cartridge loading mechanism is reduced.

In the cartridge loading mechanism of the present invention constructed above, the following effects can be obtained.

In a first construction of the present invention, it is possible to release a space occupied by a general carrier arranged on the lower side of a cartridge holder. Accordingly, a dustproof structure is obtained by perfect sealing and the body of a drive unit can be made thin.

In a second construction of the present invention, an ejecting lever can be easily attached to the cartridge loading mechanism. Accordingly, the effects of the cartridge loading mechanism in the first construction can be obtained while an increase in the number of assembly works is minimized.

In a third construction of the present invention, an ejecting button can be easily attached to the cartridge loading mechanism. Accordingly, the effects of the cartridge loading mechanism in the first construction can be obtained while an increase in the number of assembly works is minimized. Further, a backlash amount of the ejecting button can be reduced so that the drive unit body can be made thin and operability of the drive unit can be improved.

In a fourth construction of the present invention, the position of a bar contact portion of the ejecting button coming in contact with an operating jig and the position of a small hole of a front cover can be set to be low in comparison with the general case so that the drive unit body can be made thin.

In a fifth construction of the present invention, an end tip of a screw projected from a screw stopping portion and a back side of the screw stopping portion is fitted into a recessed portion even when a first door is completely opened. Accordingly, the screw and the first door are not interfered with each other so that the drive unit body can be made thin.

In a sixth, seventh, eighth or tenth construction of the present invention, a constricted portion is resiliently deformed even when the nominal position of a lower end of the second door is laid out inside the front cover. Accordingly, the constricted portion absorbs scatter in position of a groove portion. Therefore, it is possible to solve the disadvantage that no swinging cam can be rotated.

In a ninth construction of the present invention, starting timing of a raising operation of a second door is delayed in comparison with starting timing of a lowering operation of a cartridge at a loading time of the cartridge. Accordingly, no finger is nipped by the second door even when the finger is delayingly separated from the cartridge. In contrast to this, when the cartridge is ejected from the cartridge loading mechanism, timing of lowering completion of the second door is faster than timing of raising completion of the cartridge. Accordingly, no cartridge is engaged with the second door when the cartridge is discharged from the cartridge loading mechanism.

In an eleventh construction of the present invention, an escaping portion is formed in a lever and a screw stopping portion of a dust cover can be formed in a position corresponding to this escaping portion. Accordingly, in addition to the effects of the ninth construction, the dust cover and the front cover preferably come in close contact with each other so that it is possible to reliably prevent dust from entering the cartridge loading mechanism from its exterior.

In a twelfth construction of the present invention, when the cartridge holder is attached to the swinging cam, only a tongue portion is flexed so that no swinging cam is deformed.

In a thirteenth construction of the present invention, a pin having a high surface roughness is uniformly slid within a first hole so that no wear of the swinging cam is increased from a certain time point. Thus, an attaching-detaching life of the cartridge can be greatly extended.

In a fourteenth construction of the present invention, a space located in an upper portion of the drive unit body can be reduced.

In a fifteenth construction of the present invention, assembly efficiency of the cartridge loading mechanism is improved. Further, it is possible to prevent an increase in friction coefficient between a rotating shaft of the first door and a bearing portion.

Many widely different embodiments of the present invention may be constructed without departing from the spirit and scope of the present invention. It should be understood that the present invention is not limited to the specific embodiments described in the specification, except as defined in the appended claims.

What is claimed is:

1. A cartridge loading mechanism comprising:

a loading base;

a cartridge holder for mounting a cartridge storing a recording medium thereinto;

a carrier for guiding said cartridge holder to a predetermined position at an inserting or ejecting time of the cartridge;

a swinging cam for swingably attaching said cartridge holder and said carrier to said loading base; and a base plate for supporting said loading base;

the cartridge loading mechanism being constructed such that a first door for closing a cartridge insertion port at an unloading time of the cartridge is rotatably arranged in the vicinity of a front cover;

a second door for closing said cartridge insertion port at a loading time of the cartridge is slidably arranged in a direction perpendicular to an inserting/discharging direction of the cartridge;

a projection is formed in one portion of said swinging cam and extends radially outward from an attaching portion of the swinging cam, said attaching portion attaching the swinging cam to said loading base;

a lever has a groove portion in an end tip portion thereof, said groove portion being engaged with a boss portion formed on at least one of right-hand and left-hand sides of said second door;

said lever also having a shaft on a side opposite to said end tip portion, said shaft extending in the same direction as said attaching portion of said swinging cam;

said lever being rotatably attached to a hole formed on at least one of right-hand and left-hand side faces of said base plate such that the lever is moved in association with a vertical movement of said second door;

a first cam portion, a notch portion and a second cam portion are formed in said lever;

said first cam portion being constructed by a recessed portion formed in the shape of an arc having a length as a radius from said attaching portion to said projection with said attaching portion as a center;

the first cam portion comes into contact with said projection of said swinging cam in a position corresponding to a time when said cartridge holder is located in a position allowing unloading of the cartridge during which said end tip portion of said lever is located in a position for completely opening said second door;

the second cam portion comes in contact with said projection from a complete opening state of said second door to a closing state of said cartridge insertion port when said lever is rotated;

the notch portion comes in contact with said projection of said swinging cam in a position corresponding to a time when said cartridge holder is located in a position allowing loading of the cartridge during which the end tip portion of said lever is located in a position for completely closing said second door.

2. A cartridge loading mechanism as claimed in claim 1, wherein a constricted portion is formed in said lever such that a width of this lever is partially narrowed approximately in a central portion thereof in the same direction as a rotating direction of the lever.

3. A cartridge loading mechanism as claimed in claim 1, wherein an escaping portion for escaping one portion of a fixing member projected into said base plate is formed in said lever when a cover member for covering an outer side of the loading base is fixed to the base plate by the fixing member.

4. A cartridge loading mechanism as claimed in claim 1, wherein a pin is located in an attaching position of said loading base for attaching said swinging cam thereto; and said swinging cam is rotatably attached to said loading base by fitting this pin into a hole formed in said swinging cam.

* * * * *